March 26, 1963 F. J. MELVIN ET AL 3,082,852

COIN-ACTUATED DEVICES

Filed Nov. 5, 1956 10 Sheets-Sheet 1

INVENTORS
FRED J. MELVIN
MERRAL P. HAVERSTICK
BY
Roy Ellis ATT'Y.

March 26, 1963 F. J. MELVIN ET AL 3,082,852

COIN-ACTUATED DEVICES

Filed Nov. 5, 1956 10 Sheets-Sheet 2

INVENTORS
FRED J. MELVIN
MERRAL P. HAVERSTICK

BY Roy Eilers ATT'Y.

March 26, 1963 F. J. MELVIN ET AL 3,082,852

COIN-ACTUATED DEVICES

Filed Nov 5, 1956 10 Sheets-Sheet 3

INVENTORS
FRED J. MELVIN
MERRAL P. HAVERSTICK

BY [signature] ATT'Y.

COIN-ACTUATED DEVICES

Filed Nov. 5, 1956 10 Sheets-Sheet 4

INVENTORS
FRED J. MELVIN
MERRAL P. HAVERSTICK
BY Roy Eilers ATT'Y.

INVENTORS
FRED J. MELVIN
MERRAL P. HAVERSTICK
BY Roy Eilers ATT'Y.

INVENTORS
FRED J. MELVIN
MERRAL P. HAVERSTICK
BY Ray Eilers ATTY.

INVENTORS
FRED J. MELVIN
MERRAL P. HAVERSTICK
BY Roy Eilers ATT'Y.

INVENTORS
FRED J. MELVIN
MERRAL P. HAVERSTICK
BY
Ray Eilers
ATTORNEY

INVENTORS
FRED J. MELVIN
MERRAL P. HAVERSTICK
BY
Roy Eilers
ATTORNEY

INVENTORS
FRED J. MELVIN
MERRAL P. HAVERSTICK
BY
Roy Ellis
ATTORNEY.

3,082,852
COIN-ACTUATED DEVICES

Fred J. Melvin, Bellefontaine Neighbors, and Merral P. Haverstick, Normandy, Mo., assignors, by mesne assignments, to National Rejectors Inc., St. Louis, Mo., a corporation of Missouri Filed Nov. 5, 1956, Ser. No. 620,281
16 Claims. (Cl. 194—10)

Figure 1:
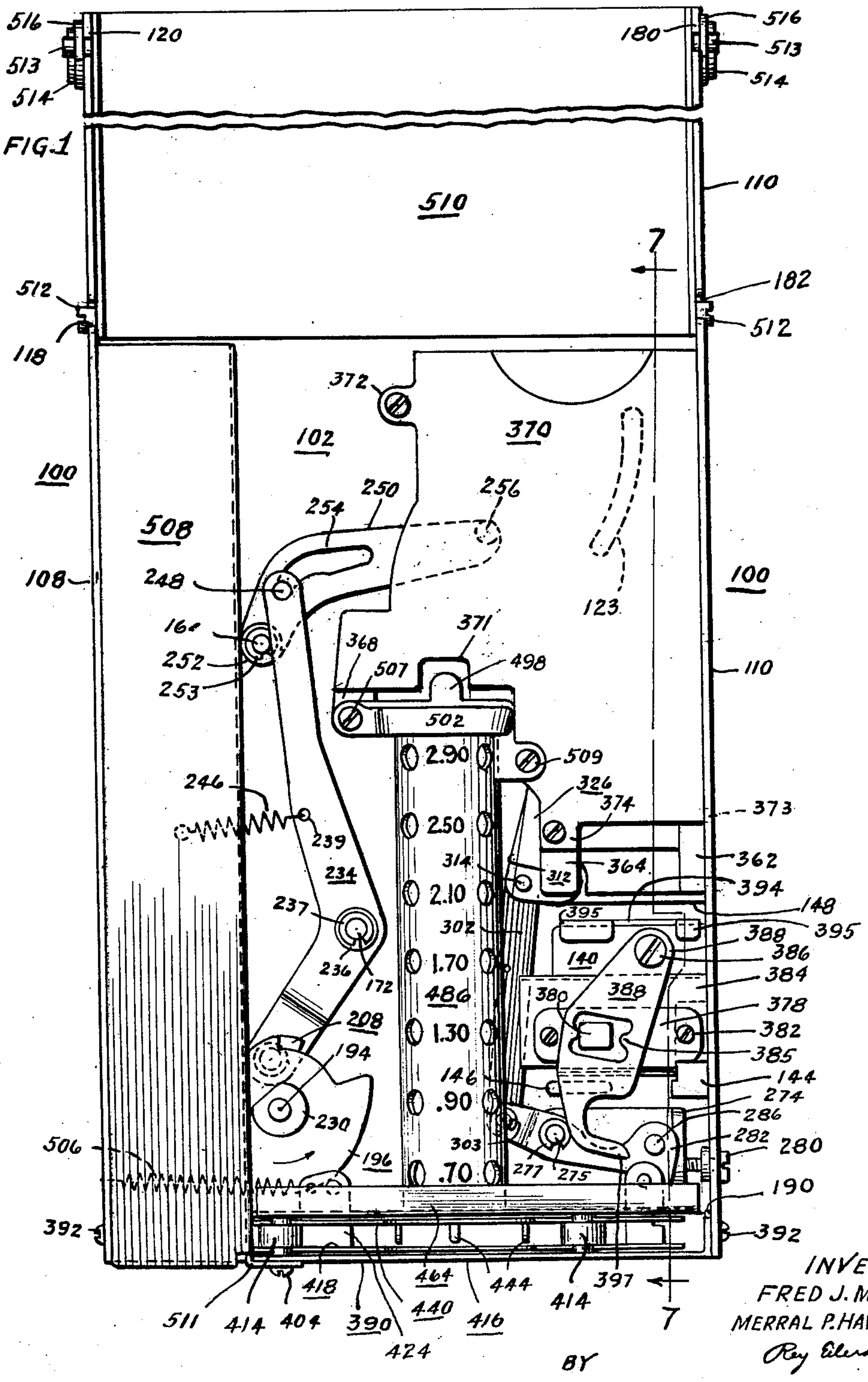

This invention relates to improvements in coin-actuated devices. More particularly, this invention relates to improvements in coin-actuated devices which can accept coinage and send an impulse to a vending machine and which can return change if coinage having a value in excess of the sales price is inserted.

It is therefore an object of the present invention to provide an improved coin-actuated device which can accept coinage and send an impulse to a vending machine and which can return change if coinage having a value in excess of the sales price is inserted.

A number of coin changers have been proposed, which could accept coinage and send impulses to vending machines and which could pay out change if the inserted coinage had values exceeding the sales price, and some of those changers have been marketed. In most of those changers a switch is provided for each of the coins that has a value in excess of the sales price, and when that switch is actuated by its coin the changer starts a cycle that pays out the required amount of change. It would be desirable to eliminate at least one of the coin-actuated switches because such switches increase the cost of the changer, and they sometimes tend to stick and resist actuation. The changer provided by the present invention attains the desired result by providing just one switch to start the change-making cycle of the changer, regardless of which coin happens to be inserted. It is therefore an object of the present invention to provide a coin changer that uses just one switch to respond to all of the coins requiring change to start the change-making cycle.

In coin changers it is desirable to prevent the paying out of change when change is not required to match the difference between the sales price and the value of the inserted coinage. Usually the coin changers make a determination of the condition of the coin-actuated switches as the ends of the cycles of those coin changers are reached; and, depending upon the condition of those switches, the coin changers will or will not respond to additional coinage to pass through another cycle. The present invention makes a determination of the presence or absence of a coin, having a value in excess of the sales price, rather than making a determination of the condition of a switch; and in doing so it provides a more direct and more positive determination. The present invention then pays out change or refuses to pay out change during the ensuing part of the cycle in which the determination is made, rather than deciding to make or refuse to make a subsequent cycle; and in doing so it provides a more direct and more immediate response to any abnormal functioning of the changer.

The present invention has a coin-responsive element that is connected to a latch which helps determine whether change coins are to be paid out, and further helps determine how many change coins are to be paid out. The present invention also has a cam that oscillates the coin-responsive element and oscillates a change pay out slide; and the cam coacts with the coin-responsive element and the latch to determine whether, and how many change coins are to be paid out. It is therefore an object of the present invention to provide a coin changer with a cam, a latch and a coin-responsive element that coact to determine whether, and how many, change coins are to be paid out.

The coin-responsive element of the present invention has a coin-intercepting portion, has a coin-feeling portion and has a coin-holding portion. The coin-intercepting portion of the coin-responsive element is normally held in position to intercept coins that have values exceeding the sales price, but that portion is periodically moved to let such coins move into register with the coin-feeling and coin-holding portions of the coin-responsive element. When this occurs, the coin-responsive element holds the latch in slide-freeing position so the cam can cause change to be paid out. Subsequently, the cam moves the coin-responsive element to a position where the coin-holding portion of that element frees the coin for movement to the cash box. It is therefore an object of the present invention to provide a coin changer with a coin-responsive element that has a coin-intercepting portion, a coin-feeling portion and a coin-holding portion.

The cam provided by the present invention has rises that move the latch and coin-responsive element, and it has falls that are disposed rearwardly of those rises. The rises cause the coin-responsive element to move, and the falls permit the latch to engage and hold the slide if no coin is present to be felt by the coin-feeling portion of the coin-responsive element. Those falls are gradual to make such the latch has time to engage and hold the slide.

The coin changer provided by the present invention has a coin reservoir and has a pair of slides that are positioned adjacent that coin reservoir. Those slides can receive coins from that reservoir and can transport those coins to a discharge position. Those slides are normally held against movement to the discharge position by the latch, but they can be released by that latch whenever coins requiring change are inserted. One of the slides moves just one change coin to coin-discharging position while the other slide moves a plurality of change coins to coin-discharging position. The slides are interrelated so the slide, that can move a plurality of change coins to coin-discharging position, can only move to that position when the one-coin slide has started to move toward coin-discharging position. The one-coin slide can, however, move to coin-discharging position even though the multi-coin slide is held out of coin-discharging position. This makes it possible for the latch to engage just the one-coin slide and still provide full control over both slides. It is therefore an object of the present invention to provide a coin-changer that has two interrelated slides controlled by just one latch.

The problem of paying out more than one coin from one slide is somewhat complicated because coins vary in thickness. Newly minted coins are supposed to have a certain predetermined thickness, but manufacturing tolerances make it impossible for all newly minted coins to have exactly the same thickness. Starting with thickness variations due to manufacturing tolerances, the coins begin to acquire even greater thickness variations due to wear. Some coins become quite thin before they are deposited in a bank and are thereupon taken out of circulation by the bank because they are too thin. Where a number of very thin coins happen to be adjacent each other in the coin reservoir of a coin changer, and where those coins happen to enter the multi-coin slide, those coins would leave enough room for another coin to start to enter the coin-receiving opening in that slide. The greater the number of coins to be paid out by a multi-coin slide, the greater the potential room for an additional coin. The present invention minimizes the likelihood of a number of thin coins leaving room for an additional coin by using two slides, thereby reducing the total number of coins paid out by the multi-coin slide. In addition, the coin changer provided by the present invention moves the single-slide coin in advance of the movement of the multi-coin slide. This frees the multi-coin slide from any thickness variation problems due to the presence of an unduly thin coin in the coin-receiving recess of the single-coin slide, and it also reduces the number of coins in the coin-receiving opening of the multi-coin slide. It is therefore an object of the present invention to provide a coin changer that has a single-coin slide and a multi-coin slide and that moves the single-coin slide in advance of the multi-coin slide.

Other and further objects and advantages of the present invention should become apparent from an examination of the drawing and accompanying description.

In the drawing and accompanying description two preferred embodiments of the present invention have been shown and described but it is to be understood that the drawing and accompanying description are for the purpose of illustration only and do not limit the invention and that the invention will be defined by the appended claims.

Figures 2, 3:
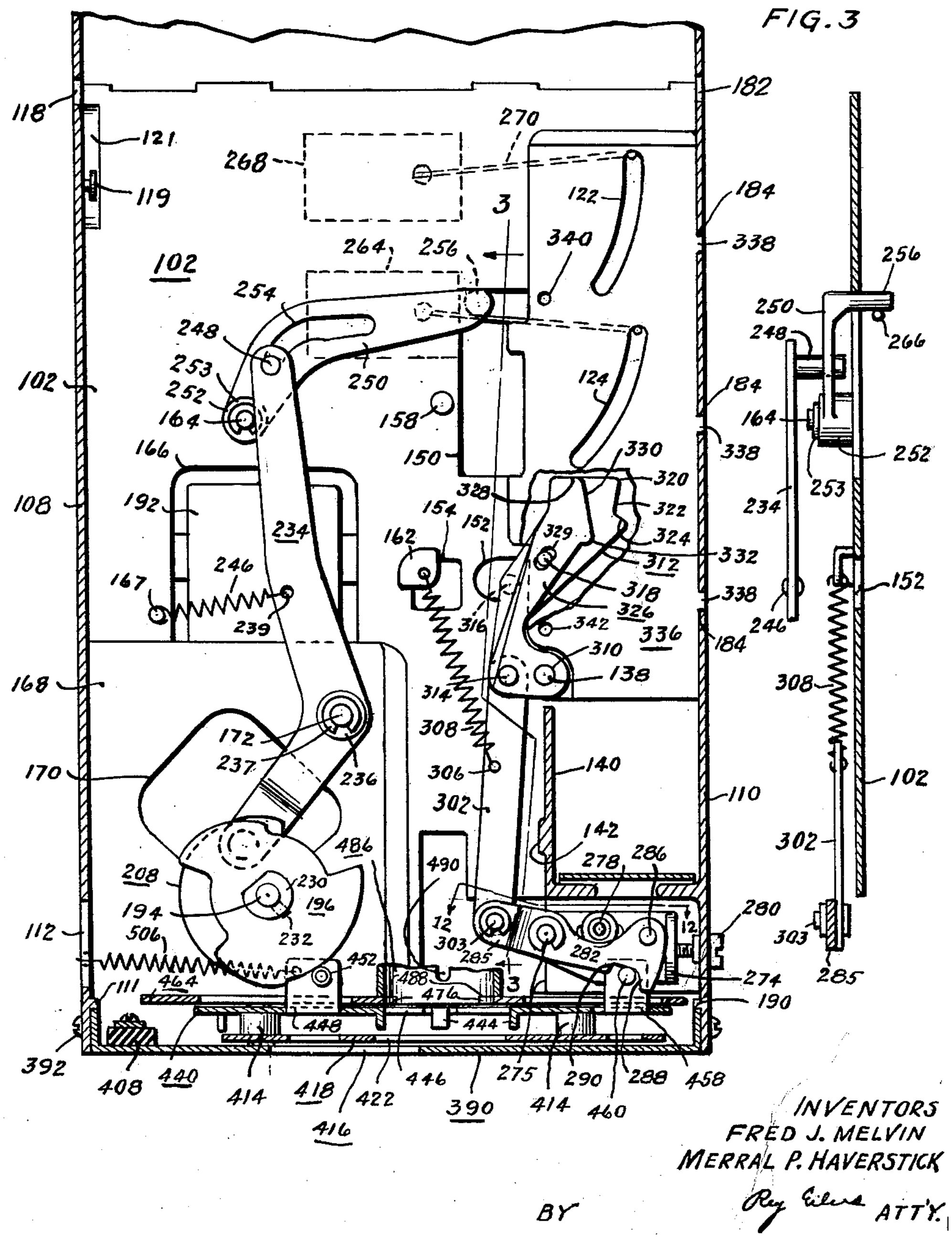
Figures 4, 5:
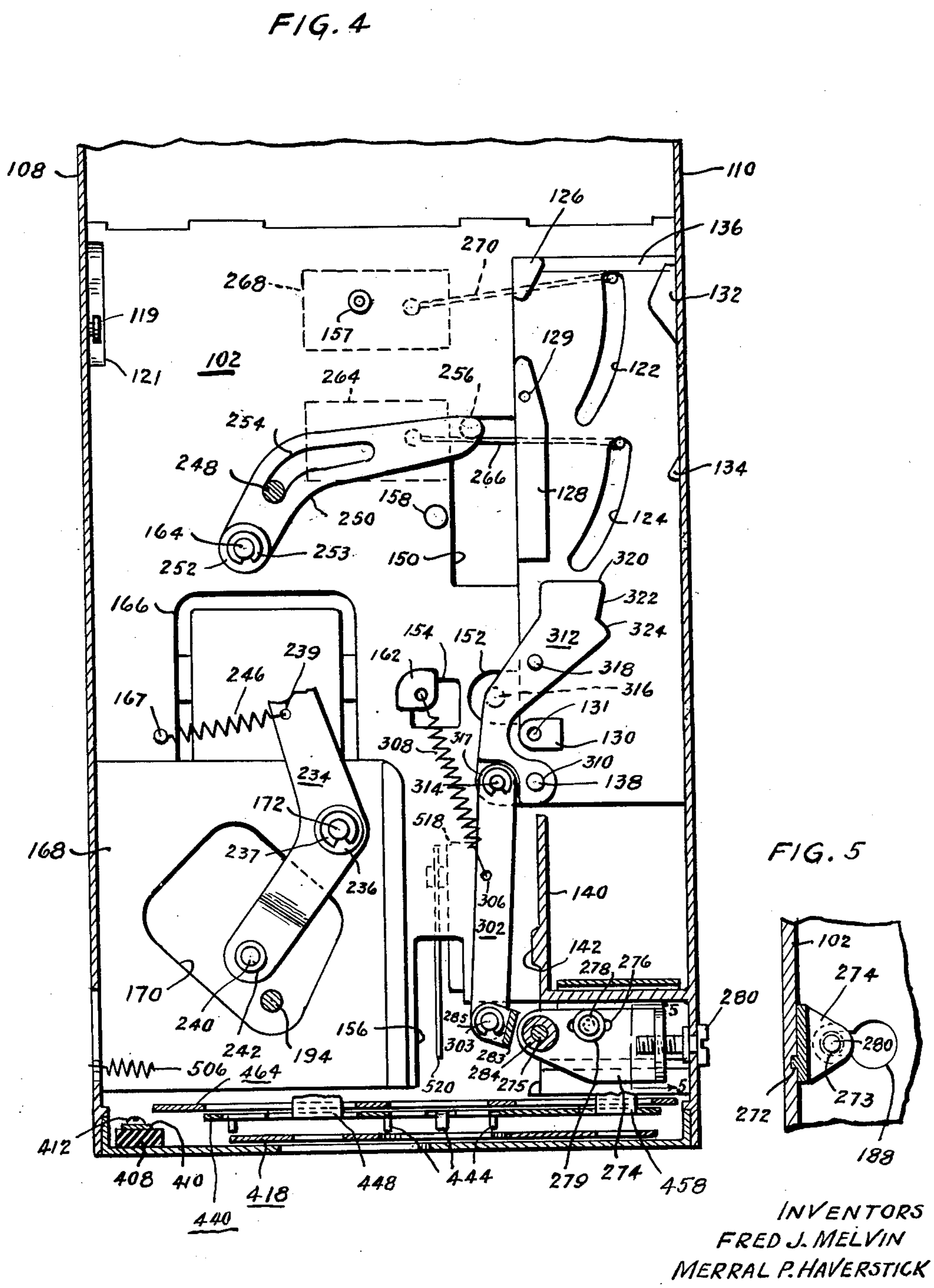
Figure 6:
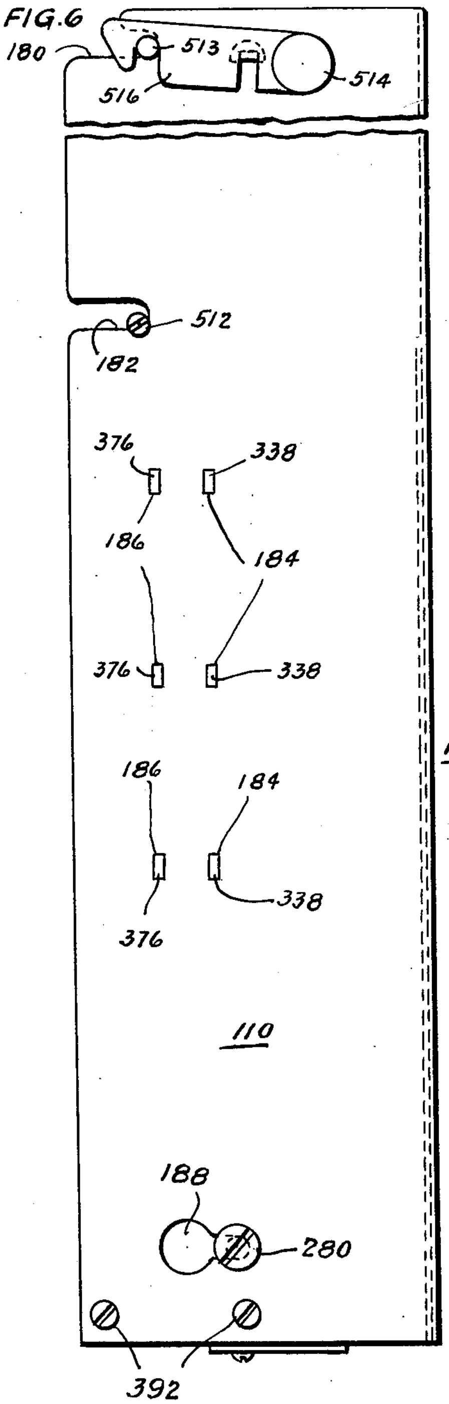
Figure 7:
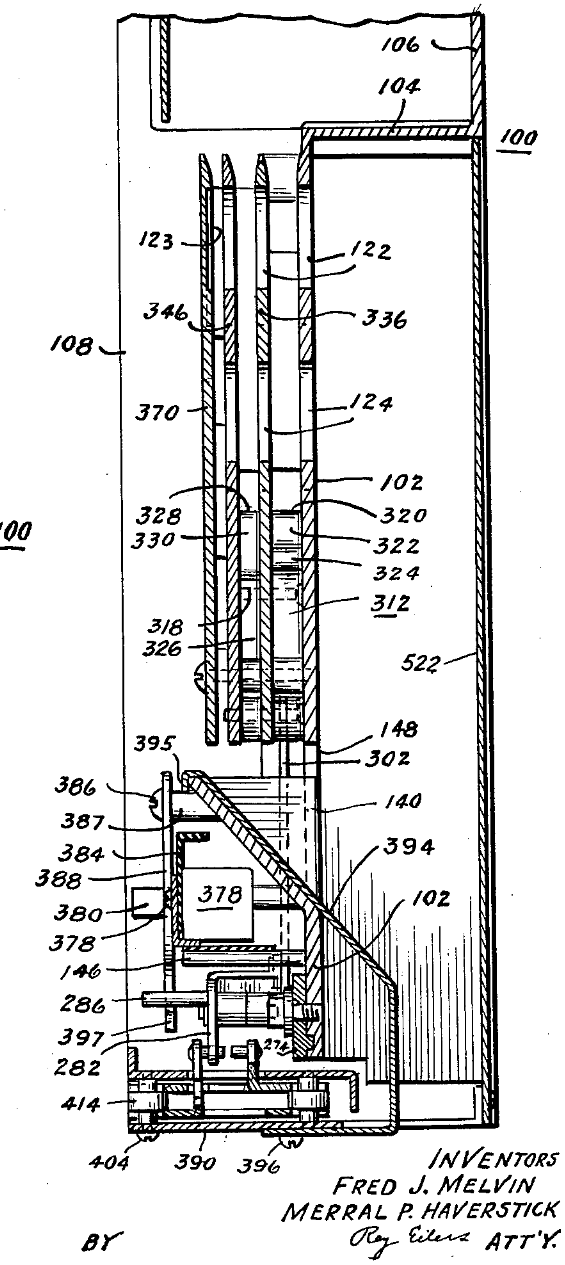
Figure 9:
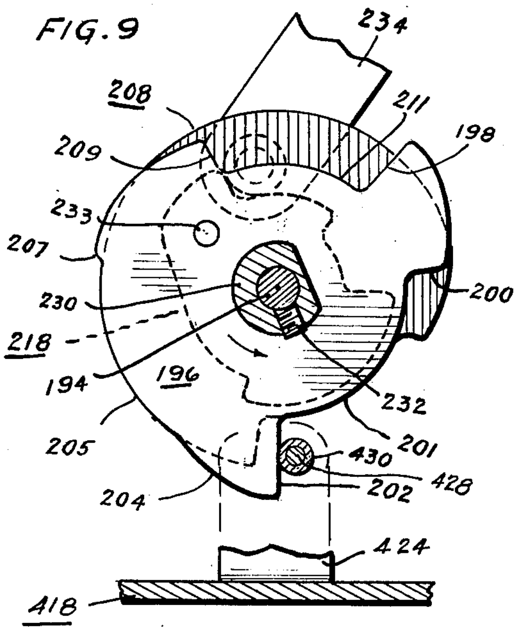
Figure 8:
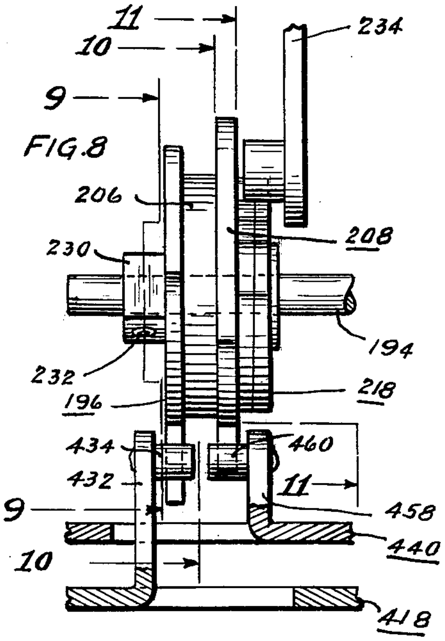
Figure 10:
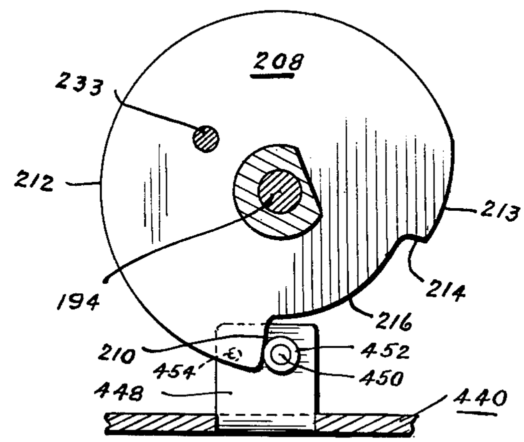
Figure 11:
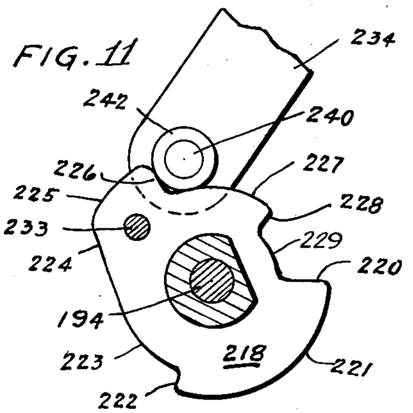

In the drawing, FIG. 1 is a partially broken, front elevational view of one form of change-making device that is made in accordance with the principles and teachings of the present invention, FIG. 2 is a partially broken-away, sectional front view of the change-making device of FIG. 1, FIG. 3 is a sectional side view of a portion of the change-making device of FIG. 2, and it is taken along the broken plane indicated by the line 3—3 in FIG. 2, FIG. 4 is another partially broken-away, sectional front view of the change-making device of FIG. 1, FIG. 5 is a sectional side view of a portion of the change-making device of FIG. 4, and it is taken along the plane indicated by the line 5—5 in FIG. 4, FIG. 6 is a partially broken, side elevational view of the change-making device of FIG. 1, FIG. 7 is a partially broken-away, sectional side view of the change-making device of FIG. 1, and it is taken along the plane indicated by the line 7—7 in FIG. 1, FIG. 8 is a partially broken-away, sectional side view of the rotatable cams and of the coin-discharging slides in the change-making device of FIG. 1, FIG. 9 is a partially broken-away sectional front view of one of the cams shown in FIG. 8, and it is taken along the plane indicated by the line 9—9 in FIG. 8, FIG. 10 is a sectional front view of another of the cams shown in FIG. 8, and it is taken along the broken plane indicated by the line 10—10 in FIG. 8, FIG. 11 is a sectional front view of the third cam of FIG. 8, and it is taken along the broken plane indicated by the line 11—11 in FIG. 8, and it also shows the lower end of the lever moved by that cam.

Figure 12:
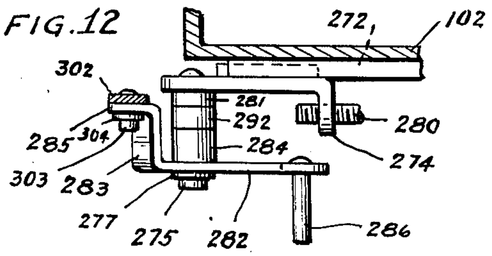
Figure 13:
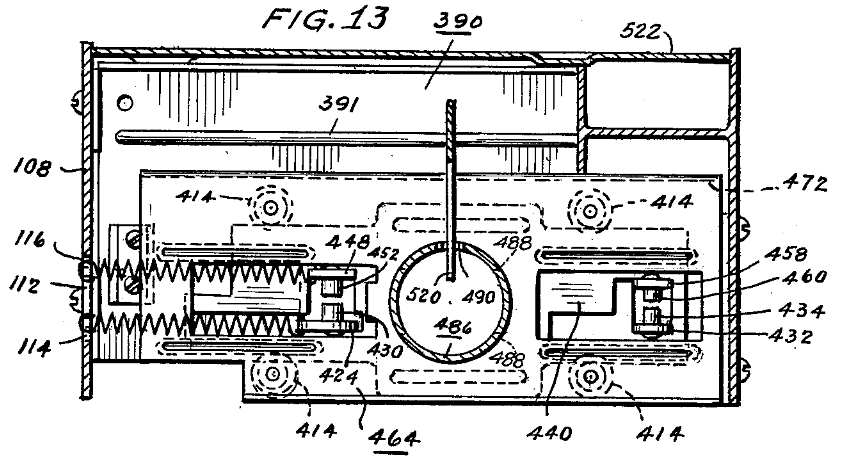
Figures 14, 15:
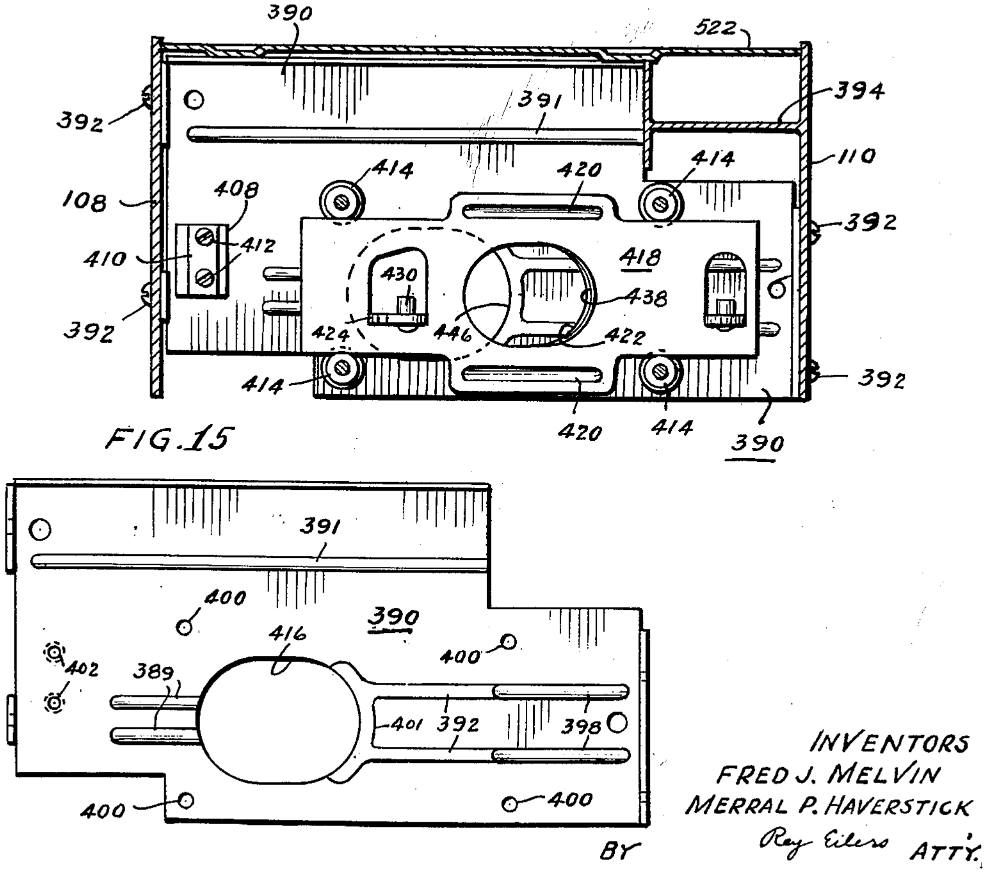
Figure 16:
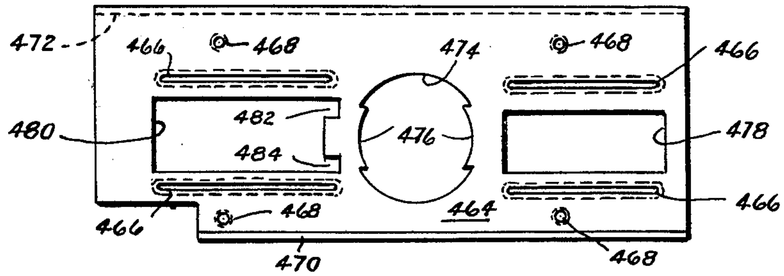
Figure 17:
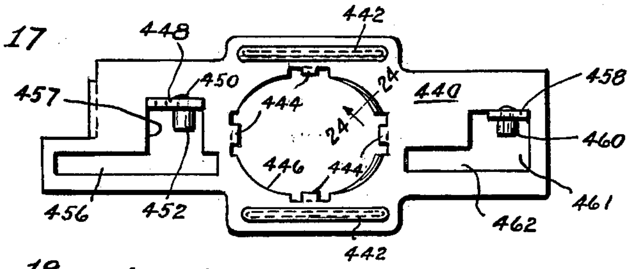
Figure 18:
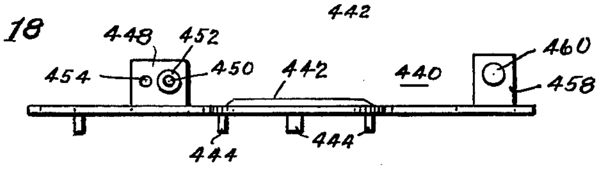
Figure 24:
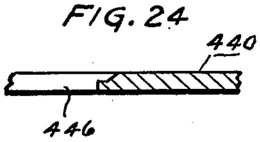
Figure 19:
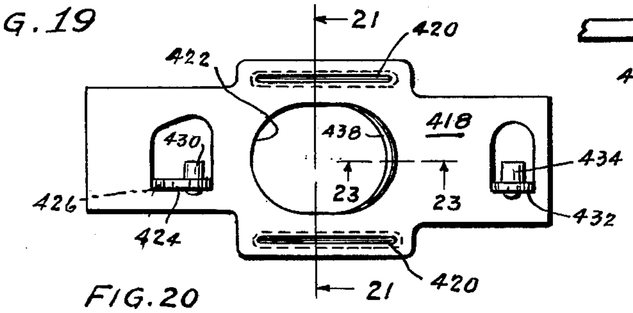
Figures 20, 21, 22, 23:
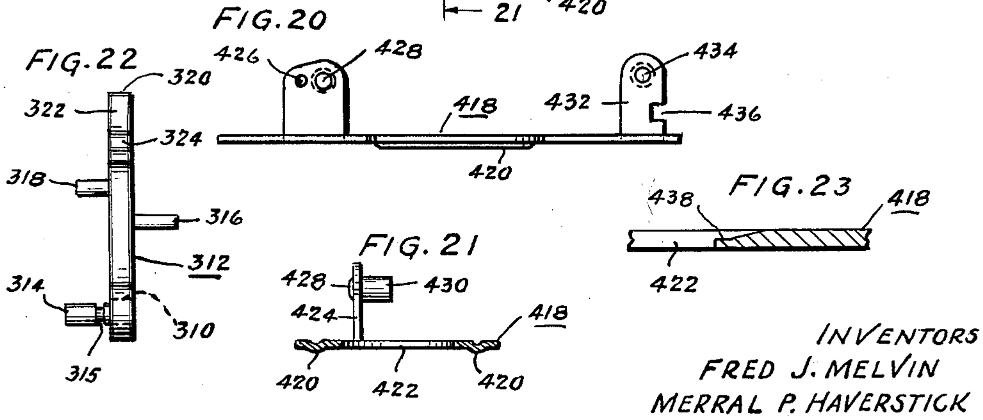
Figure 25:
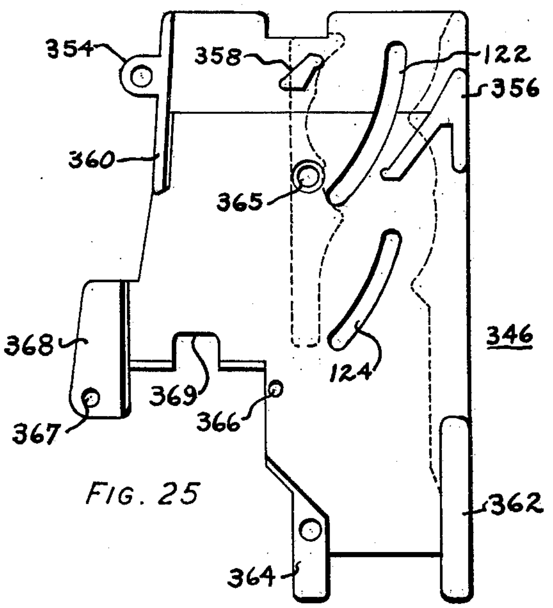
Figure 27:
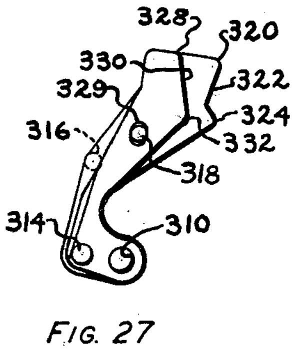
Figure 28:
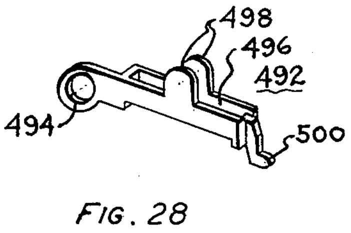
Figure 26:
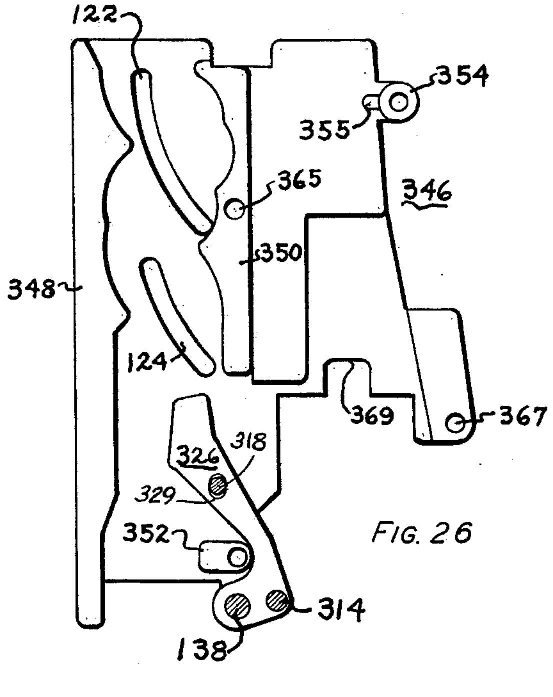
Figure 29:
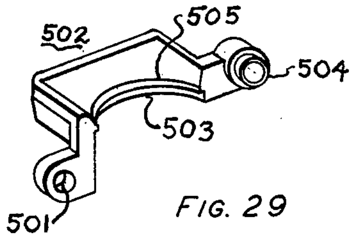
Figure 31:
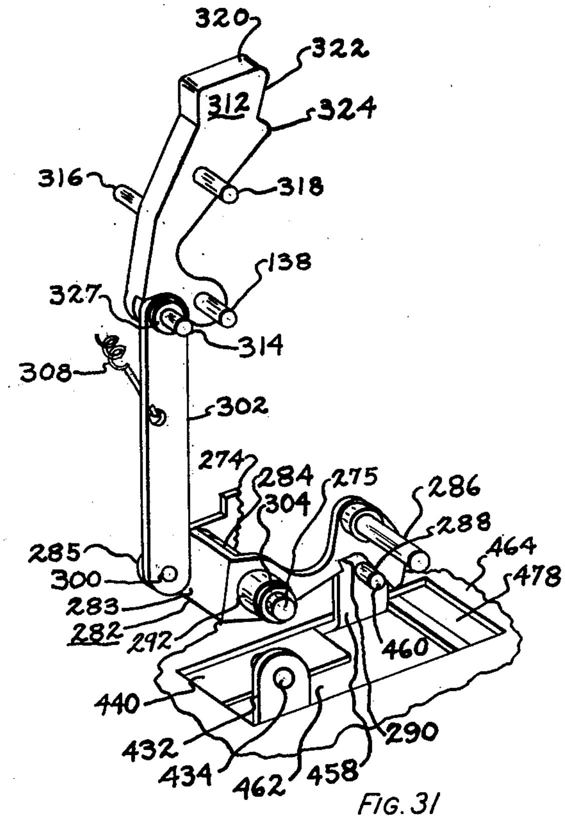
Figure 30:
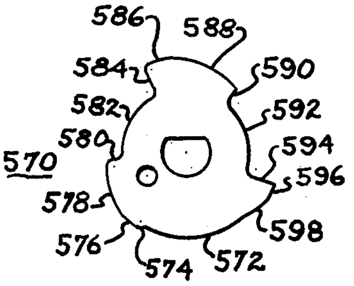
Figure 32:
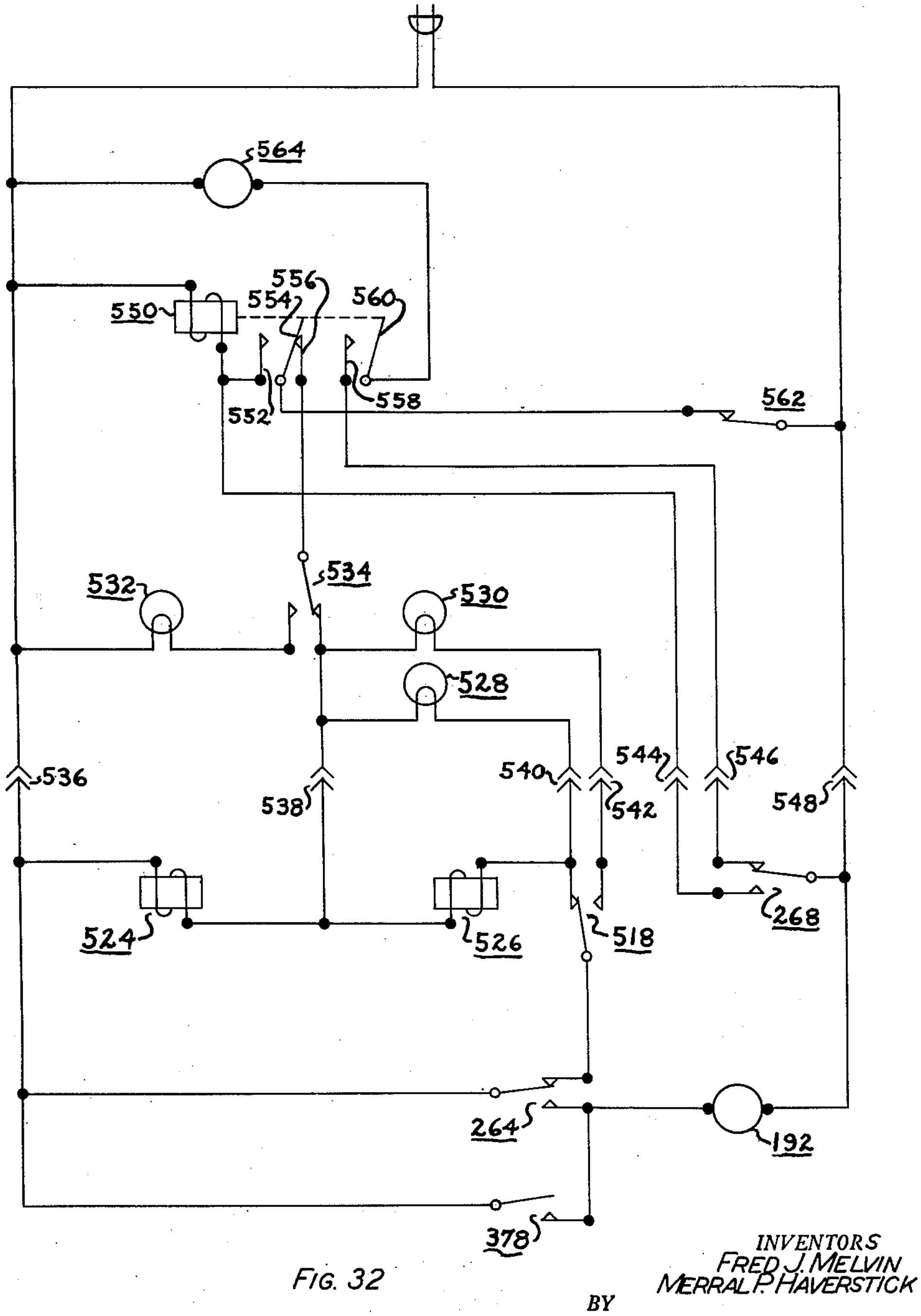

FIG. 12 is a partially sectioned plan view of the latch provided for the coin-discharging slides of the change-making device of FIG. 1, and it is taken along the plane indicated by the line 12—12 in FIG. 2, FIG. 13 is a sectional plan view showing the base plate, portions of the coin-discharging slides, and the plate that supports the coin reservoir for the change-making device of FIG. 1, FIG. 14 is a sectional plan view showing the base plate and the lowermost coin-discharging slide of the change-making device of FIG. 1, FIG. 15 is a plan view of the base plate of the change-making device of FIG. 1, FIG. 16 is a plan view of the plate which supports the coin reservoir of the change-making device of FIG. 1, FIG. 17 is a plan view of the upper coin-discharging slide of the change-making device of FIG. 1, FIG. 18 is a front elevational view of the coin-discharging slide of FIG. 17, FIG. 19 is a plan view of the lower coin-discharging slide of the change-making device of FIG. 1, FIG. 20 is a front elevational view of the coin-discharging slide of FIG. 19, FIG. 21 is a sectional side view of the coin-discharging slide of FIG. 19, and it is taken along the plane indicated by the line 21—21 in FIG. 19, FIG. 22 is a side elevational view of one of the coin-responsive elements used in the coin-handling device of FIG. 1, FIG. 23 is a sectional view, on an enlarged scale, of a portion of the coin-discharging slide of FIG. 19, and it is taken along the plane indicated by the line 23—23 in FIG. 19, FIG. 24 is a sectional view, on an enlarged scale, of a portion of the coin-discharging slide of FIG. 17, and it is taken along the plane indicated by the line 24—24 in FIG. 17, FIG. 25 is a front elevational view of a partition or wall that is used in the change-making device of FIG. 1, FIG. 26 is a rear elevational view of the partition or wall of FIG. 25, FIG. 27 is a front elevational view of the coin-responsive element of FIG. 22 assembled with the other coin-responsive element of the change-making device of FIG. 1, FIG. 28 is a perspective view of a pivoted guide disposed at the upper end of the coin reservoir of the change-making device of FIG. 1, FIG. 29 is a perspective view showing the rear of a coin inlet disposed at the top of the coin reservoir of the change-making device of FIG. 1, FIG. 30 is a front elevational view of a cam that is used in a modified form of change-making device provided by the present invention, FIG. 31 is a perspective view of the linkage between the latch and the coin-responsive element of the modified form of change-making device, and FIG. 32 is the circuit diagram of the change-making device of FIG. 1.

Referring to the drawing in detail, the numeral 100 generally denotes the frame of one form of change-making device provided by the present invention. That frame has a vertical wall portion 102; and that portion extends downwardly from a point which is a short distance above the vertical midpoint of the frame 100, as indicated particularly in FIG. 7. A horizontally directed wall portion 104 extends rearwardly from the upper end of the vertical wall portion 102, and an upper vertical wall portion 106 extends upwardly from the horizontal wall portion 104; and the wall portion 106 extends to the upper end of the frame 100. The frame 100 has a left-hand flange 108, and it has a right-hand flange 110; and those flanges extend forwardly from vertical lines defined by the upper wall portion 106.

A horizontally directed rib 111 is provided at the inner face of the flange 108, and that rib is disposed a short distance above the bottom of that flange. A generally similar horizontally directed rib 190 is provided at the inner face of the right-hand flange 110, and that rib is in register with the rib 111 on the flange 108. A generally rectangular opening 112 is provided in the left-hand flange 108 of the frame 100, and that opening is disposed above the level of the rib 111. Two smaller openings 114 and 116 are provided in the flange 108 adjacent the opening 112; the opening 114 being spaced forwardly, and the opening 116 being spaced rearwardly, of the opening 112. A generally horizontal notch 118 is provided in the left-hand flange 108 of the frame 100, as shown particularly in FIG. 1. A rivet 119 is secured to the inner face of the left-hand flange 108 at a point below the level of the notch 118, and that rivet has its head spaced a short distance to the right of the inner face of the left-hand flange 108. The forward upper edge of the left-hand flange 108 of the frame 100 is cut away, as at 120, to form a notch.

The vertical wall portion 102 of the frame 100 is provided with an arcuate slot 122, and it is also provided with a second arcuate slot 124. The slots 122 and 124 are generally vertical, and the slot 124 is located wholly below the level of the slot 122. A boss 126 is provided on, and projects forwardly from, the wall portion 102, and that boss is disposed to the left of the slot 122. An elongated vertically directed boss 128 is disposed to the left of the slots 122 and 124, and that boss is alined with the boss 126 while being spaced below that boss. The boss 128 has a threaded opening 129 therein. A horizontally directed boss 130 is provided on, and projects forwardly from, the wall portion 102, and that boss is disposed below the bosses 126 and 128. A threaded opening 131 is provided in the boss 130. A boss 132 is provided on, and projects forwardly from, the wall portion 102, and that boss is disposed to the right of the slot 122. A smaller boss 134 is formed on, and projects forwardly from, the wall portion 102, and that boss is disposed to the right of the slot 124. An inclined face 136 is provided on the wall portion 102 immediately above the slot 122, and that face inclines forwardly and downwardly, as indicated particularly in FIG. 7. A pivot 138, in the form of a stud, is riveted or otherwise secured to the wall portion 102 so it projects forwardly from that wall portion. That pivot is disposed below the level of the boss 130.

An accepted coin chute 140 has a vertical wall which starts at a point below the stud 138 and extends downwardly, as indicated particularly in FIG. 4. As indicated particularly in FIG. 7, that wall has a horizontal upper edge and has a downwardly and rearwardly inclined lower edge. The chute 140 has a transversely directed wall that lies in the plane of the inclined lower edge of the vertical wall of that chute, and that wall spans the distance between the vertical wall of chute 140 and the right-hand flange 110 of frame 100. A forwardly extending projection or stud 142 is provided immediately adjacent the vertical wall of the accepted coin chute 140, and a second stud or forwardly extending projection 144 is provided adjacent the right-hand flange 110. The stud 144 has its lower end adjacent the lower end of the transversely directed wall of accepted coin chute 140, and it has its upper end disposed a short distance above the level of the stud 142. A third stud or forwardly extending projection 146 is provided adjacent the lower end of the vertical wall of the accepted coin chute 140; and that stud is at the level of the lower end of stud 144. The accepted coin chute 140 is disposed immediately adjacent, and in front of, an opening 148 in the wall portion 102 of the frame 100, as indicated particularly in FIG. 7.

A vertically directed, generally rectangular opening 150 is provided in the wall portion 102 of frame 100, and that opening is disposed to the left of the boss 128. An opening 152 with an arcuate left-hand edge is formed in the vertical portion 102 of the frame 100, and that opening is disposed below and in register with the opening 150. A generally rectangular opening 154 is provided in the wall portion 102, and that opening is disposed to the left of the opening 152. A notch 156, that is generally L-shaped in configuration, is provided in the vertical wall portion 102; and that notch extends upwardly from the lower edge of that wall portion. A short, threaded boss 157 is provided on, and extends forwardly from, the wall portion 102, and that boss is disposed above and to the left of the opening 150. A stud 158 is on and extends forwardly from, the wall portion 102; and that boss is disposed immediately adjacent the left-hand edge of the opening 150. A small plate 162 is disposed forwardly of, and overlies part of, the opening 154; and that plate has a small opening in it.

A pivot 164, in the form of a stud, is riveted or otherwise secured to the vertical wall portion 102 of the frame 100, and that pivot extends forwardly from that wall portion. A generally rectangular opening 166 is provided in the wall portion 102 below the level of the pivot 164. A pin 167 is provided on, and projects forwardly from, the wall portion 102; and that pin is disposed to the left of the opening 166 in that wall portion.

The numeral 168 denotes a section of the wall portion 102 which is offset a short distance forwardly of the plane of the wall portion 102. The offset wall section 168 has an opening 170 therein, and the axis of that opening is inclined to the vertical, as shown particularly in FIG. 4. A pivot 172, in the form of a stud, is riveted or otherwise secured to the offset wall section 168; and that pivot extends forwardly from that offset wall section.

The upper and forward edge of the right-hand flange 110 of the frame 100 is cut away, as at 180. The cut away portion of the flange 110 forms a notch similar to the notch formed at the cut away portion 120 of the flange 108 of frame 100. A horizontally directed notch 182 is provided in the right-hand flange 110, and that notch is similar to, and in register with, the notch 118 in the flange 108 of frame 100. Three vertically directed slots 184 are provided in the flange 110, and those slots define a vertical line that is parallel to the front edge of that flange. Three vertically directed slots 186 are provided in the flange 110, and the slots 186 also define a vertical line that is parallel to the front edge of the flange 110. The slots 186 are in register with the slots 184, and they are disposed between the slots 184 and the front edge of the flange 110. A keyhole slot 188 is provided in the flange 110 adjacent the bottom edge of that flange. The frame 100 could be made in different ways, but it will preferably be made as a die casting.

The numeral 192 denotes a motor which has a gear train, not shown, and which has a rotatable output shaft 194. The shaft 194 extends forwardly through the opening 170 in the offset wall section 168 of the wall portion 102 of frame 100. The coil of the motor 192 is in register with, and part of it projects forwardly through, the opening 166 in the wall portion of frame 100. The frame of the motor 192 is disposed behind the offset wall section 168, and part of that frame can be seen through the opening 170 in that wall section.

The forward end of the output shaft 194 of motor 192 supports a cam which has a front section 196, a middle section 208 and a rear section 218. A spacer 206 is disposed between the front section 196 and the middle section 208. The rear section 218 is shown as being made of two narrow plates, but it could readily be formed from a single thick plate. A hub 230 is provided for the cam, and a set screw 232 is threaded into a threaded opening in that hub. The inner end of the set screw 232 will bear against the shaft 194 to prevent accidental shifting of the cam relative to that shaft.

The front section 196 of the cam has a rise 198, and that rise is quite abrupt; the face of the rise being radial. The rise 198 is followed by a fall 200 which is also abrupt; that fall being generally radial. Between the rise 198 and the fall 200 is a dwell which has a generally concentric leading portion and has a trailing portion which constitutes a gradual fall. The fall 200 is followed by a generally concentric portion 201; and that portion, in turn, is succeeded by an abrupt rise 202 which is radial. The rise 202 is followed by a gradual fall 204, and that fall is followed by a substantially concentric portion 205 which has a length of roughly seventy degrees. A small rise 207 follows portion 205, and an abrupt fall 209 is disposed rearwardly of the rise 207; and the cam section 196 has a concentric portion and a gradual fall between the rise 207 and the fall 209. A reduced diameter concentric portion 211 extends between the fall 209 and the rise 198. The outermost portion of the rise 198 is further from the axis of shaft 194 than is the outermost portion of the rise 202, and the outermost portion of the rise 202 is further from the axis of shaft 194 than is the outermost portion of the rise 207. The concentric portion 211 and the concentric portion 201 between fall 200 and rise 202 have the same radius.

The middle section 208 of the cam has a rise 210 which is followed by a long concentric dwell 212 of approximately two hundred and fifty degrees; and that dwell is followed by a gradual fall 213. An abrupt fall 214 succeeds the gradual fall 213, and that fall in turn is followed by a reduced diameter concentric portion 216 which extends to the rise 210.

The reduced diameter portion 216 of the middle section 208 of the cam has the same radius as the generally concentric portions 201 and 211 of the front section 196 of the cam. The outermost portion of the rise 210 and the dwell 212 of the middle section 208 of the cam have the same radius as the concentric portion 205 of the front section 196 of the cam. The outermost portions of the falls 200 and 209 of cam section 196 have the same radius; and the outermost portion of the fall 214 of cam section 208 has a radius that is smaller than the radius of any other fall of the cam sections 196 and 208.

The rear section 218 of the cam has an abrupt rise 220, a fall 222, a gradual rise 224, a fall 226 and still another fall 228. The dwell 221 between the rise 220 and the fall 222 is concentric with the shaft 194; and the dwell 227 following the fall 226 and the dwell 229 following the fall 228 are also concentric with the shaft 194. A short concentric dwell 223 follows the fall 222, and that dwell is succeeded by the gradual rise 224. This latter rise is succeeded by a concentric dwell 225. As indicated particularly in FIG. 9, the rear section 218 of the cam is smaller than either of the front or middle sections 196 and 208 of the cam. Only the rise 224 and the dwell 225 of the rear section 218 project outwardly beyond the imaginary circle that is defined by the dwells 201 and 211 which follow the falls 200 and 209 of the front section 196 of the cam. Alined openings are provided in the sections 196, 208 and 218 of the cam, and those openings receive an aligning pin 233.

The numeral 234 denotes a lever which has an upper arm and a lower arm, and those arms subtend an obtuse angle. The lever 234 has a hub 236 which telescopes over the pivot 172 carried by the offset wall section 168 of frame 100. A C-washer 237 engages an annular groove at the front end of the pivot 172 and thereby prevents accidental separation of the lever 234 from the pivot 172. The lever 234 has an opening 239 therein above the level of the hub 236, and it has a rearwardly extending pin 248 secured to the upper arm thereof, as by riveting. The lever 234 has a forwardly extending pin 240, and that pin rotatably supports a roller 242. The roller 242 normally engages, and is moved by, the rear section 218 of the cam, as indicated particularly in FIGS. 8 and 11.

A helical extension spring 246 has one end thereof telescoped through the opening 239 in the lever 234. The other end of the helical extension spring 246 is hooked around the stud 167 which extends forwardly from the wall portion 102 of the frame 100. The spring 246 biases the lever 234 for counter-clockwise rotation about the pivot 172 and thereby biases the roller 242 into engagement with the rear section 218 of the cam. The spring 246 will, however, yield to permit clockwise rotation of the lever 234 as the roller 242 is engaged and moved by the rises 220 and 224 of that rear section of the cam.

The numeral 250 denotes a lever which has a hub 252, and that hub is telescoped over the pivot 164 that extends forwardly from the wall portion 102. A C-washer 253 engages an annular groove at the forward end of the pivot 164 to prevent accidental separation of the lever 250 from the pivot 164. A generally arcuate slot 254 is provided in the lever 250, and that slot accommodates the rearwardly extending pin 248 carried by the lever 234. The lever 250 has a rearwardly extending pin-like projection 256 at the free end thereof, and that projection extends rearwardly through the opening 150 in the wall portion 102. The right-hand end of the lever 250 overlies the stud 158, and that stud limits clockwise movement of that lever. The top edge of the opening 150 will intercept the projection 256 on the lever 250 and thereby limit counter-clockwise rotation of that lever.

The pin 248 carried by the lever 234 coacts with the spring 246 and with the slot 254 in the lever 250 to rotate the lever 250 in the counter-clockwise direction about the pivot 164. Gravity will act to rotate the lever 250 in the clockwise direction about the pivot 164, but pin 248, spring 246 and the slot 254 can easily overcome the effect of gravity and rotate lever 250 in the counter-clockwise direction. In the "at rest" position of the change-making device of FIG. 1, the roller 242 on lever 234 is disposed between the fall 228 and the rise 220. The diameter of the concentric portion 229 is such that the spring 246 can rotate the lever 234 and its roller 242 far enough in the counter-clockwise direction to cause the pin 248 to coact with the slot 254 to rotate the lever 250 to the position shown by FIG. 2. In that position, the projection 256 on the lever 250 abuts the upper edge of the opening 150 in the wall portion 102.

The numeral 264 denotes a switch which is mounted at the rear face of the vertical wall portion 102 of the frame 100. That switch has an actuator 266 which is overlain by the projection 256 that extends rearwardly from the lever 250. That actuator is a stiff wire, and it is generally L-shaped in configuration. The foot of the actuator 266 extends forwardly through the slot 124 in the vertical portion 102 of the frame 100. A switch 268 is mounted at the rear face of the vertical wall portion 102 at a point above the level of the switch 264. The switch 268 has an actuator 270 which is a stiff wire and which is generally L-shaped in configuration. The foot of the actuator 270 extends forwardly through the slot 122 in the wall portion 102.

The lower right-hand section of the wall portion 102 has a horizontally directed guide slot 272. That guide slot is shown particularly in FIG. 5, and it receives a rib on the rear face of an L-shaped bracket 274. That bracket has a threaded opening 273 in the forwardly extending foot thereof; and the leg of that bracket carries a forwardly extending pivot 275 in the form of a pin, and that pivot has an enlarged base 281 abutting the bracket 274. The pivot 275 is mounted on the bracket 274 adjacent the left-hand end of that bracket. The bracket 274 also has a horizontal slot 276 and that slot is intermediate the pivot 275 and the foot of the bracket 274. A set screw 278 extends through the slot 276 in the bracket 274 and seats in the wall section 102 of the frame 100. A washer 279 encircles the shank of the screw 278 and underlies the head of that screw. An adjusting screw 280, which has a threaded shank and a grooved head, has its shank threaded into the opening 273 of the bracket 274; and it has the groove in the head thereof lodged in the keyhole opening 188 of the right-hand flange 110 of frame 100. Loosening of the set screw 278 and rotation of the adjusting screw 280 will shift the bracket 274, and thereby the pivot 275, laterally relative to the frame 100.

A latch 282 has a hub 284 extending rearwardly from the rear face thereof; and it also has a flange 283 that extends rearwardly from the left-hand end thereof. The flange 283 has an ear 285 that projects laterally from the rear edge of that flange, as indicated particularly in FIG. 12. That ear has an opening through it, and the axis of that opening is parallel to the axis of the hub 284. The latch 282 has a forwardly extending pin 286 adjacent the right-hand end thereof, it has an inclined camming surface 288 thereon, and it has a holding notch 290 spaced to the left of the camming surface 288. The camming surface 288 is below the level of the pin 286 and is generally in vertical registry with that pin. The hub 284 of the bracket 282 telescopes over the forward end of the pivot 275, and a sleeve-like spacer 292 also telescopes over that pivot and is disposed between the hub 284 of latch 282 and the enlarged base 281 of the pivot 275. A C-washer 277 engages an annular groove adjacent the front end of the pivot 275 to prevent accidental separation of the latch 282 from that pivot.

A connecting rod 302 has an opening at the top thereof and it carries a forwardly extending pin 303 adjacent the bottom thereof. That pin accommodates, and extends forwardly through the opening in the ear 285 on the flange 283 of latch 282. A C-washer 304 engages an annular groove at the forward end of the pin 303 to prevent accidental separation of that pin and the connecting rod 302. The connecting rod 302 also has an opening 306 intermediate the top and bottom thereof, and that opening accommodates one end of a helical extension spring 308. The other end of that spring is hooked in the opening in the plate 162 on the frame 100, and the spring 308 acts through connecting rod 302 to bias the latch 282 for rotation in the clockwise direction. However, that spring can yield to permit counter-clockwise rotation of that latch.

The numeral 312 generally denotes a coin-responsive element which has an opening 310 that can telescope over the pivot 138. That element has a forwardly extending pin 314 adjacent the lower end thereof, it has a rearwardly extending pin 316 adjacent the vertical midpoint thereof, and it has a forwardly extending pin 318 disposed above the level of the pin 316. The element 312 has a coin-blocking portion 320 at the upper right-hand corner thereof, it has a coin-feeling portion 322 below the level of the coin-blocking portion 320, and it has a coin-holding portion 324 below the level of the coin-feeling portion. The pin 314 has an annular groove 315 therein, and that groove is closer to the rear end of that pin than it is the front end of that pin. The pin 314 has the opening in the upper end of the connecting rod 302 telescoped over it, and thereafter a C-washer 317 is pressed into the groove 315. That C-washer prevents accidental separation of the connecting rod 302 and the coin-responsive element 312. The pin 316 on the element 312 extends rearwardly through the opening 152 in the vertical portion 102 of the frame 100.

The right-hand flange 110 of the frame 100 and the bosses 126 and 128 define a vertical passageway for a coin requiring a plurality of change coins, as for example a quarter; and the coin-blocking portion 320 of the coin-responsive element 312 will normally be within and block that passageway. However, the coin-responsive element 312 can rotate in the counter-clockwise direction about the pivot 138 to move the coin-blocking portion 320 out of the path of a quarter in the said passageway. When this occurs, the quarter can fall downwardly until it engages and is held by the coin-holding portion 324 of the element 312. At such time, the quarter will be intermediate the right-hand flange 110 of frame 100 and the coin-feeling portion 322 of the element 312. The element 312 can be rotated even further in the counter-clockwise direction to enable the coin-holding portion 324 thereof to move out of engagement with the quarter and permit that quarter to fall downwardly to the accepted coin chute 140.

The numeral 326 denotes a second coin-responsive element which has an opening 310 to telescope over the pivot 138. The element 326 has a second opening to the left of the opening 310, and that second opening telescopes over the forwardly extending pin 314 on the coin-responsive element 312. The element 326 has an elongated slot 329 therein, and that slot is disposed above the level of the opening 310 and the said second opening. The second opening telescopes over the pin 314 and the slot 329 telescopes over the pin 318; the interaction of that opening and slot with those pins coacts with the interaction of pivot 138 with the openings 310 to hold the elements 312 and 326 for conjoint rotation about the pivot 138. The elongated nature of the slot 329 does not permit the two elements 312 and 326 to rotate relative to each other; instead, it merely facilitates ready assembly of those elements.

The coin-responsive element 326 has a coin-blocking portion 328 at the upper right-hand corner thereof, it has a coin-feeling portion 330 below the level of the coin-blocking portion 328, and it has a coin-holding portion 332 below the level of the coin-feeling portion 330. There is not the sharp line of cleavage between the coin-feeling and the coin-holding portions that is present in the coin-responsive element 312. In fact, in the coin-responsive element 326, the coin-feeling and coin-holding portions merge together and become the same.

The numeral 336 denotes a partition or wall which has arcuate slots 122 and 124 similar to the identically numbered slots in the wall portion 102. Part of the wall 336 is broken away in FIG. 2 to make it possible to show the relative positions of the elements 312 and 326 when they are mounted in the change-making device and are "at rest." The partition 336 is generally rectangular and is taller than it is wide. The slots 122 and 124 in the wall 336 are in register with, and have the same curvature and disposition as, the slots in the wall 102. The wall 336 has three projections 338 that extend beyond the right-hand edge of that partition and extend into the slots 184 in flange 110 of frame 100. The interaction between those projections and those slots holds the right-hand edge of the wall 336 against shifting relative to the frame 100. The left-hand edge of the wall 336 is spaced from the vertical wall portion 102 of the frame 100 by the bosses 126, 128 and 130. An opening 340 is provided in the wall 336 in register with the threaded opening 129 in the boss 128, and an opening 342 is provided in the wall 336 in register with the threaded opening 131 in the boss 130. A short, generally horizontal, arcuate slot, not shown, extends inwardly from the left-hand edge of the wall 336; and that slot accommodates the pin 318 which is mounted on and extends forwardly from the coin-responsive element 312. The wall 336 is disposed between the coin-responsive elements 312 and 326, and it coacts with the wall portion 102, the flange 110 and the bosses 126 and 128 to direct quarters into engagement with the coin-responsive element 312. As indicated particularly in FIGS. 2 and 7, the top of the wall 336 is tapered to provide a feather edge.

The numeral 346 denotes a wall or partition which has its upper end feathered, and which has arcuate slots 122 and 124 similar to the identically numbered slots in the vertical wal portion 102 of the frame 100. An elongated vertical boss 348 is provided at the left-hand side of the rear face of the wall 346, and that boss defines a plurality of cusps. A shorter vertical boss 350 is also provided at the rear face of the wall 346, and that boss is spaced laterally from the boss 348 to define a coin passageway for coins requiring a single change coin, as for example a dime. The wall 346 has a horizontal boss 352 at the lower edge of the rear face thereof, and that boss is generally in register with the short vertical boss 350. The bosses 348, 350 and 352 abut the wall 336 to space the wall 346 from the wall 336 and define a passageway for dimes therebetween. A cylindrical boss 354, with a reinforcing rib 355, is provided at the right-hand side of the rear face of the wall 346, and that boss engages the short, drilled and tapped boss 157 on the wall portion 102 to space the left-hand edge of the wall 346 from that wall portion.

An inverted V-shaped boss 356 is formed at the front face of the wall 346, and that boss is disposed to the right of the slot 122. A short, inclined boss 358 is disposed to the left of the slot 122; and that boss is disposed at a level approximating the level of the top of the boss 356. A narrow vertical boss 360 is disposed immediately adjacent the cylindrical boss 354, and a boss 368 is disposed below and to the left of the boss 360. A vertical boss 362 is disposed adjacent the right-hand side of the lower edge of the front face of the wall 346, and a boss 364 with an inclined upper edge is formed at that front face to the left of the boss 362. A pin 366 is provided on the front face of the wall 346, and that pin has the upper face thereof tapered forwardly and downwardly. The pin 366 is spaced above the upper end of the inclined portion of the boss 364. The cylindrical boss 354 has an opening therethrough, and that opening is in register with the opening in stud 157. The boss 364 has an opening therethrough, and that opening is in register with the opening 131 in boss 130. The boss 368 has a threaded opening 367 therein, and the boss 350 has an opening 365 therein; and the opening 365 is in register with the opening 129 in the boss 128. A generally rectangular notch 369 is provided in that edge of the wall 346 that is between boss 368 and pin 366, and that notch extends upwardly from that edge.

The bosses 356 and 358 receive coins that do not require change, as for example nickels; and they direct the nickels to the left of the slot 124. Those nickels will move downwardly and to the left across the front face of the wall 346, and they will move toward the notch 369. As is explained hereinafter, the nickels can, under certain circumstances, pass downwardly between the bosses 362 and 364.

The numeral 370 denotes a wall or partition which has an arcuate recess 123 in the rear face thereof, and that recess is similar to the slot 122 in the wall portion 102 of frame 100. The recess 123 accommodates the forward end of the foot of the switch actuator 270. Thus, the recess 123 makes it possible for the foot of the switch actuator 270 to completely span the nickel passageway. An ear 372, with an opening through it, is provided at the upper left-hand corner of the wall 370; and that opening is in register with the threaded opening in the boss 157 on wall portion 102. A second ear 374 extends downwardly from the wall 370, and that ear has an opening in register with the opening 131 in the stud 130. Three projections 376 extend outwardly beyond the right-hand edge of the wall 370, and those projections telescope into the slots 186 in the right-hand flange 110 of the frame 100. The projections 376 coact with the slots 186 to hold the right-hand edge of the wall 370 against shifting relative to the frame 100. The left-hand edge of the wall 370 abuts the bosses 360 and 364 and 368 to hold that left-hand edge in spaced relation to the wall 346. The wall 370 has a generally rectangular notch 371 which is in register with the notch 369 in the wall 346.

The numeral 378 denotes a manually operated switch which has a handle 380. Fasteners 382, in the form of screws, extend through openings adjacent the opposite ends of the switch 378 and seat in the studs 142 and 144. Insulating paper 384 extends outwardly beyond the sides, top and bottom of the switch 378 to protect the terminals and leads of that switch.

A pivot 386, shown in the form of a screw, telescopes through an opening in the upper end of a latch 388 and seats in a drilled and tapped opening in a stud 387. That stud projects forwardly from the transversely directed wall of the accepted chute 140, and it is disposed above the level of the manually-operated switch 378. The latch 388 depends downwardly from the pivot 386, and that latch has a central opening which telescopes over the handle 380. Projections 385 are provided at two of the sides of the opening in the latch 388, and those projections are disposed closely adjacent two of the opposite sides of the handle 380. Consequently, shifting of the handle 380 of switch 378 will cause rotation of the latch 388. The lower end of that latch has a hook 397 thereon; and that hook will respond to shifting of the handle 380 to the right to pass under the pin 286 on latch 282 and raise that pin upwardly, thereby rotating the latch 282 in the counter-clockwise direction.

The numeral 390 denotes the bottom plate of the change-making device of FIG. 1. That bottom plate has a number of upwardly extending flanges or ears at its sides and at its rear; and the flanges or ears at the sides of that plate are provided with threaded openings. That bottom plate is provided with a generally ovate opening 416 through it, and upwardly extending ribs 389 are formed in that plate immediately adjacent the left side of that opening. Those ribs will preferably be formed by a punch that strikes the bottom of the plate 390, and those ribs will have smoothly rounded upper surfaces. A rib 391 of lower height is provided in the base plate 390 adjacent the rear edge of that base plate, and that rib will stiffen that base plate. A pair of low, almost imperceptible ribs 392 are provided immediately adjacent the right side of the opening 416 and those ridges merge with an arcuate rib 401 of almost imperceptible height. That rib abuts and is complementary to the right-hand edge of the opening 416. The ribs 392 and the rib 401 normally underlie the coin reservoir 486 of the change-making device and will keep the lowermost coin in that reservoir from engaging the base plate itself. Higher ribs 398 abut, and are contiguous with, the low ribs 392, and the ribs 398 extend to the right-hand side of the base plate 390.

The base plate has four openings 400 therethrough, and those openings are grouped as shown particularly in FIG. 15. The base plate has two threaded openings 402 at the left-hand side thereof, and those openings underlie a resilient pad 408. A plate 410 overlies the resilient pad 408; and fasteners 412, in the form of screws, extend downwardly through openings in that plate and in that pad and seat in the openings 402. The base plate 390 is secured to the flanges 108 and 110 of the frame 100 by screws 392 which extend through openings in those flanges and seat in threaded openings in the ears or flanges of that base plate.

A bent plate 394, which is best shown in FIG. 7, has ears 395 thereon that telescope down over the upper edge of the transversely extending wall of the accepted coin chute 140. The plate 394 extends downwardly and rearwardly along the rear face of the transversely extending wall of the accepted coin chute 140, and then it is directed downwardly until it is at the level of the bottom of the frame 100. Thereafter, the plate 394 has a portion that is bent forwardly to extend under the base plate 390; and that forwardly extending portion is held by a fastener 396. That fastener, which has the form of a screw, extends upwardly through a notch in the forwardly bent portion of plate 394 and then passes upwardly through the rearmost right-hand opening 400 in the base plate 390.

The numeral 414 denotes combination spacers and guides that have axial openings through them, and those openings are disposed in register with the openings 400 in the base plate 390. The upper and lower ends of the combination spacers and guides are of reduced diameter, as shown particularly in FIG. 1.

The numeral 418 generally denotes a coin-discharging slide that has reduced width ends that can be disposed between the reduced diameter lower ends of the combination guides and spacers 414. The larger diameter central portions of those combination spacers and guides will overlie the reduced width ends of the slide 418 and prevent accidental separation of that slide from the base plate 390, but will permit reciprocation of that slide relative to the base plate 390. Downwardly extending ribs 420 are provided for the slide 418, preferably by a punching operation, and those ribs will engage the base plate 390. Those ribs will coact with the ribs 389 and 398 on the base plate 390 to minimize frictional resistance between that base plate and that slide.

An opening 422 of ovate configuration is provided in the wide portion of the slide 418, and that opening is narrower and shorter than the opening 416 in the base plate 390. When the left-hand end of the slide 418 is abutting the resilient pad 408, the right-hand edge of the opening 422 is in register with the right-hand edge of the opening 416. At that time, the lefthand edge of the opening 422 will be spaced a short distance to the right of the left-hand edge of the opening 416.

The numeral 424 denotes an upright support that has been punched out of the narrow left-hand end of the slide 418. That upright support has an opening 426 therethrough, and that support carries a horizontally directed, rearwardly-extending pin 428. That pin rotatably supports a roller 430, and that roller extends transversely of the long axis of the slide 418. The numeral 432 denotes an upright support that has been punched out of the righthand end of the slide 418. That upright support has a notch 436 in the righthand edge thereof, and it carries a rearwardly extending pin 434. The pin 434 has its axis parallel to the axis of pin 428 and roller 430.

The right-hand edge of the opening 422 is coined down, as at 438, to reduce the thickness of that edge to a value equal to the thinnest nickel that could reasonably be expected to be in circulation. Newly minted nickels have a thickness close to seventy-five thousandths of an inch, and it is a rare nickel that is permitted to wear to a thickness of less than fifty-five thousandths of an inch. However, to be on the safe side, the right-hand edge of the opening 422 is coined to a thickness of fifty thousandths of an inch. The coining operation provides an upwardly inclined area, as shown particularly in FIG. 23.

The numeral 440 generally denotes a second coin-discharging slide that has reduced width ends, and those ends can be disposed between the reduced diameter upper ends of the combination guides and spacers 414. The larger diameter central portions of those combination spacers and guides will underlie and support the reduced width ends of the slide 440. A plate 464 rests atop the combination spacers and guides 414, and that plate coacts with those combination spacers and guides to prevent accidental separation of the slide 440 from the base plate 390. The fastener 396, a fastener 404, and two other fasteners, not shown, extend upwardly through the openings 400 in the base plate 390 and through the combination spacers and guides 414 and seat in threaded openings 468 in the plate 464. Those fasteners thus interconnect the plates 390 and 464 and the slides 418 and 440 as a unit, and that unit can be handled as a subassembly.

Upwardly extending ribs 442 are provided on the slide 440, preferably by a punching operation, and the upper faces of those ribs are smooth and round. Those ribs abut the under face of the plate 464. Four ears 444 are provided at the ends of the long and short axes of an ovate opening 446 in the slide 440, and those ears extend downwardly below the bottom face of the slide 440. However, those ears terminate short of the upper face of the slide 418, as shown in FIG. 1. The opening 446 and the ears 444 can act upon and discharge three nickels. The opening 446 is substantially the same size as the opening 422 in the slide 418. The right-hand edge of the opening 446 in slide 440 is coined down, much in the manner in which the right-hand edge of the opening 422 in slide 418 is coined down. However, the coining down of slide 440 is more pronounced than is the coining down of slide 418. That coining down of the right-hand edge of the opening 446 provides an inclined portion on the slide 440 to the right of the opening 446, all as shown in FIG. 24.

An upright support 448 is punched out of the left-hand end of the slide 440, and that support has an opening 454 through it. In addition, that support carries a forwardly extending pin 450, and that pin rotatably supports a roller 452. The roller extends transversely of the long axis of the slide 440. The numeral 456 denotes a longitudinally extending slot in the slide 440 that is contiguous with the opening 457 in that slide which was formed when the upright support 448 was punched out. That slot accommodates the upright support 424 of slide 418 when the slides 418 and 440 are in assembled relation.

The numeral 458 denotes an upright support that is punched out of the right-head end of the slide 440, and that support carries a forwardly extending pin 460. The axis of the pin 460 is parallel to the axes of pin 450 and of roller 452. A slot 462 is provided in the slide 440, and that slot extends longitudinally of that slide. That slot is contiguous with the opening 461 formed by punching out the upright support 458. The slot 462 accommodates the upright support 432 of the slide 418 when the slides 418 and 440 are in assembled relation.

The plate 464 has longitudinally extending, downwardly projecting ribs 466, and those ribs will preferably be formed by punching. The lower faces of the ribs 466 will be smoothly arcuate; and those ribs will coact with the ribs 442 on the slide 440 to miminize frictional resistance between the slide 440 and the plate 464. An upwardly extending flange 470 is provided at the front edge of the plate 464, and a downwardly depending flange 472 is provided at the rear edge of that plate. Those flanges make the plate 464 strongly resistant to bending or warping.

The numeral 474 denotes a generally circular opening at the approximate center of the plate 464. That opening has two concave projections 476 extending inwardly from the opposite ends of the longitudinally-extending diameter of that opening. The projections 476 fit into cut away portions at the bottom of the coin reservoir 486; that bottom being cut away at two oppositedly disposed points, as indicated by the numeral 488 in FIG. 2. The portions of the bottom of coin reservoir 486 that are not cut away extend down through the opening 474 and are flush with the bottom of plate 464. The interaction between the cut away portions of the coin reservoir 486 and the projections 476 of the opening 474 hold that coin reservoir 486 against accidental rotation relative to the plate 464.

The numeral 478 denotes a rectangular opening that is adjacent the right-hand end of the plate 464. That opening accommodates the upright supports 432 and 458 of the coin-discharging slides 418 and 440 respectively. The numeral 480 denotes a rectangular opening that is adjacent the left-hand end of the plate 464, and that opening accommodates the upright supports 424 and 448 of the slides 418 and 440 respectively. Short notches 482 and 484 are provided adjacent the right-hand end of the rectangular opening 480, and those notches are contiguous with the opening 480.

The coin reservoir 486 has a vertically-directed slot 490 therein; and when the cut away portions of the coin reservoir 486 are telescoped over the projection 476 of the opening 474 in plate 464, the slot 490 will be disposed at the rear of that coin reservoir. That slot accommodates a vertically-directed feeler 520 which is secured to the horizontal shaft of a switch 518. As indicated particularly in FIG. 4, the switch 518 is disposed rearwardly of the wall portion 102 of frame 100, and the feeler 520 is held in register with the L-shaped notch 156 in the lower edge of that wall portion. A spring within the switch 518 biases the feeler 520 forwardly into and through the slot 490 in the rear of the coin reservoir 486; but that spring can yield to permit nickels in the coin reservoir 486 to force the feeler 520 rearwardly and out of the coin reservoir 486.

The numeral 492 generally denotes a coin guide which is positioned adjacent the upper end of the coin reservoir 486, and which steadies the uppermost nickel in that coin reservoir whenever that coin reservoir is full. That uppermost nickel will be unable to enter the coin reservoir 486 fully and to lay over on its side, as all of the lower nickels have done; instead, that uppermost nickel will only be able to enter the coin reservoir 484 part way, and it will come to rest with its lower edge resting upon the second uppermost nickel in that coin reservoir.

The coin guide 492 has a circular, horizontally-directed opening 494 at the left-hand end thereof, it has an elongated vertically-directed slot 496 therein, it has a pair of upwardly extending ears 498, and it has a laterally-extending finger 500 at the right-hand end thereof. The slot 496 is long enough and wide enough to permit nickels to pass freely through it and enter the coin reservoir 486 whenever that reservoir is not full; but that slot is narrow enough to provide lateral support for the uppermost nickel when that nickel comes to rest with its lower edge resting on the second uppermost nickel in that reservoir. The ears 498 extend upwardly above the upper edge of the slot 492, and those ears will provide lateral support for any subsequently inserted nickels that move into engagement with the uppermost nickel in the coin reservoir 486 and are kept from entering the slot 492 by that uppermost nickel. The finger 500 on the coin guide 492 is disposed between the partition 346 and the partition 370, and that finger will permit ready rotation of the coin guide 492 about the axis of its opening 494 while preventing rotation of that coin guide about a vertical axis. The bottom edge of the coin guide 492 rests upon, and is supported by, the top of the coin reservoir 486.

The numeral 502 denotes a coin inlet in the form of a half-funnel. As indicated particularly in FIG. 29, the rear face of that coin inlet has an arcuate portion 503 which abuts the upper end of the front face of the coin reservoir 486. An arcuate lip 505 is immediately above the arcuate portion 503, and that lip overlies and rests upon the upper edge of the coin reservoir 486. That lip coacts with the projection 476 of the opening 474 in plate 464 to hold the coin reservoir 486 against movement relative to that plate. The coin inlet 502 has a generally rectangular forwardly-extending front portion; and it has a downwardly and rearwardly inclined rear portion that extends to and terminates in the lip 505. Nickels introduced into the coin inlet 502 will slide downwardly to, and past, the lip 505 and will pass between the ears 498 of the coin guide 492 to enter the coin reservoir 486. A tubular projection 504 is provided at the right-hand end of the rear face of the coin inlet 502, and that tubular projection extends through the opening 494 of the coin guide 492 to constitute the pivot for that coin guide.

A fastener 507, shown as a screw, extends through the tubular projection 504 and seats in the threaded opening 367 of the boss 368 on the partition 346. The coin inlet 502 also has an opening 501, and that opening receives a fastener 509, shown as a screw, which seats in an opening in the wall or partition 370. The fasteners 507 and 509 fixedly secure the coin inlet 502 to the partitions 346 and 370 and thereby fixedly secure the upper end of the coin reservoir 486 in position.

The numeral 506 denotes a pair of helical extension springs. One end of the forward most spring 506 is hooked through the opening 114 in the flange 108 and the other end of that spring is hooked through the opening 426 of the upright support 424 on slide 418. One end of the rearmost spring 506 is hooked through the opening 116 in the flange 108 while the other end of that spring is hooked through the opening 454 in the upright support 448 on the slide 440. The springs 506 bias the slides 418 and 440 toward the left-hand flange 108 of frame 100, and thereby bias the slide 418 toward the resilient pad 408 adjacent that flange. However, those springs can yield to permit movement of the slides 418 and 440 toward the right-hand flange 110 of the frame 100.

The numeral 508 denotes the rejected coin chute of the change-making device provided by the present invention. As indicated particularly in FIG. 1, that chute is vertically directed and it is immediately adjacent the left-hand flange 108 of frame 100. A notch, not shown, is provided at the rear of the chute 508, and that notch telescopes over and is held by the shank of the rivet 119. The rear edge of the notch extends into a recess 121 in the wall portion 102 of frame 100. The head of the rivet 119 coacts with the notch to prevent movement of the upper end of the coin chute 508 to the right. An ear 511 is provided adjacent the bottom of the coin chute 508; and that ear has a notch, not shown, through which the fastener 404 extends before it passes upwardly through the foremost left-hand opening 400 of the base plate 390. The fastener 404 can be tightened to securely hold the ear 511 fixed relative to the base plate 390. The rejected coin chute 508 underlies the rejected coin passages of the slug rejector 510, for the change-making device, and directs rejected coins to a duct that will deliver those coins to a receptacle at the exterior of the vending machine.

The slug rejector 510 can be of standard, commercially available form, and it will preferably be made so it receives nickels, dimes and quarters through a common entrance and then tests and sorts those coins before directing them to three horizontally spaced outlet openings. Those outlet openings will be above, and in register, with the quarter, dime and nickel passageways defined by the walls 102 and 336, 336 and 346, and 346 and 370, respectively. That slug rejector has pins 512 which are disposed in the notch 118 in the flange 108 and in the notch 182 in the flange 110. The pins 512 are located adjacent the lower edges of the side flanges of the slug rejector 510, and pins 513 are located adjacent the upper ends of those side flanges. The pins 513 are disposed in the cut away portions 120 and 180 of the flanges 108 and 110 of frame 100; and catches 516 have notches which telescope downwardly over the pins 513 on the slug rejector 510 to hold the upper ends of that slug rejector against movement relative to frame 100. The catches 516 are pivoted to the flanges 108 and 110 by pivots 514, and those catches can be rotated upwardly to free those pins.

The upper wall portion 106 effectively protects the parts of the change-making device located above the level of the wall 104. However, the wall portion 102 can not effectively protect the parts of the change-making device located below the level of the wall 104 because that wall portion is spaced forwardly of the rear edges of flanges 108 and 110. These latter parts are, however, protected by a back cover plate 522. That plate extends from a line immediately adjacent the wall 104 to the bottom of the flanges 108 and 110. That plate can be removed to provide ready access to the various parts that are rearward of the wall portion 102 and are below the wall 104.

In FIG. 32, a male plug is shown as connecting the vending machine and its change-making device to a source of power, and in many installations such a male plug will be used. In other installations, the vending machine and its change-making device will be connected to the source of power by leads that are wholly encased in electrical conduit. The various electrical components of the vending machine and its change-making device are interconnected by the posts 536, 538, 540, 542, 544, 546 and 548 of a connector plug such as a "Jones" connector plug.

The numeral 524 denotes an electromagnet which has an armature, not shown, that can enter the nickel path of the slug rejector 510 and reject nickels. The numeral 526 denotes a second electromagnet which has an armature that can enter the dime and quarter paths in the slug rejector 510 and reject dimes and quarters. When the change-making device is "at rest" and the vending machine has been filled and ample nickels are in the coin reservoir 486, the electromagnets 524 and 526 will be energized and will hold their armatures out of the coin paths in the slug rejector 510. This enables coins to be tested and passed by that slug rejector.

A lamp is denoted by the numeral 528, and that lamp will usually be associated with a sign stating "5¢—10¢—25¢," thereby indicating that the vending machine will respond to nickels, dimes and quarters. The numeral 530 denotes a lamp which is associated with a sign stating "5¢ Only"; and the numeral 532 denotes a lamp which is associated with a sign stating "Empty." An empty switch 534 will have its movable contact in the position shown when the vending machine is filled with merchandise and is "at rest."

The numeral 550 denotes the coil of a relay in the vending machine, and that relay has contacts 552, 554, 556, 558 and 560. Those contacts are shown in the positions they normally occupy when the vending machine is "at rest." The delivery switch of the vending machine is denoted by the numeral 562. The electromotive device of the vending machine, which may be a solenoid, an electromagnet or a motor, is denoted by the numeral 564.

When the change-making device is "at rest," the reduced diameter, concentric portion 229 of cam section 218 is adjacent and in register with the roller 242 on lever 234, the concentric portion 205 of cam section 196 is in engagement with the roller 430 on slide 418, and the concentric dwell 212 of cam section 218 is in engagement with the roller 452 on slide 440. The lever 234 will be held in its extreme counter-clockwise position by the spring 246; and the pin 248 on lever 234 will abut the left-hand end of slot 254 in lever 250 and hold that latter lever in its extreme counter-clockwise position, thereby holding the pin-like projection 256 against the upper edge of opening 150. Switch actuators 270 and 266 will be in the positions shown in FIG. 2, and the electrical components will be shown by FIG. 32.

The engagement of roller 452 with the arcuate dwell 212 of cam section 218 holds the opening 446 of slide 440 in register with the opening 474 of plate 464 and in register with coin reservoir 486. The engagement of roller 430 with the concentric portion 205 of cam section 196 holds the opening 422 of slide 418 in register with the openings 446 and 474 of slide 440 and plate 464, respectively, and in register with coin reservoir 486. One nickel will be lodged in the opening 422 of slide 418, and three nickels will be lodged in the opening 446 and between the ears 444 of slide 440. The nickel in the opening 422 of slide 418 will be resting upon the low, almost imperceptible ribs 392 and 401 of the base plate 390.

The inclined camming face 288 of latch 282 will be urged against pin 434 on the upright support 432 of slide 418 by the spring 308, and the coin-responsive elements 312 and 326 will be closely adjacent the positions shown in FIG. 2. The coin-blocking portions 320 and 328 of the coin-responsive elements 312 and 326 will effectively block the quarter passageway and the dime passageway, respectively.

When a nickel is inserted, it will pass through the slug rejector 510 and enter the passageway between the walls 346 and 370. As it passes downwardly through that passageway, the nickel will pass between the inverted V-shaped boss 356 and the short inclined boss 358 and will engage the forwardly extending foot of switch actuator 270, thereby forcing that actuator toward the lower end of slot 122. In doing so, the nickel will shift the movable contact of switch 268 from its upper position to its lower position in FIG. 32; and thereupon a circuit is completed that starts at the right side of line, extends through connector posts 548, through the movable and lower contacts of switch 268, through connector posts 544 and through the relay coil 550 to the left side of line. That circuit energizes the relay coil 550 and shifts the movable contacts 554 and 560 from their right-hand to their left-hand positions; thereupon completing a holding circuit and also breaking the circuits of lamp 528 and of electromagnets 524 and 526. The holding circuit starts at the right side of line, extends through delivery switch 562, through relay contacts 554 and 552 and through relay coil 550 to the left side of line. The circuits of lamp 528 and electromagnets 524 and 526 start at the right side of line, extend through delivery switch 562, through relay contacts 554 and 556, through the movable and right-hand contacts of switch 534 and then, separately, through lamp 528 and connector posts 540 and the movable and left-hand contacts of switch 518 and the movable and upper contacts of switch 264, through connector posts 538 and electromagnet 524, and through connector posts 538 and electromagnet 526 and the movable and left-hand contacts of switch 518 and the movable and upper contacts of switch 264, and then collectively through connector posts 536 to the left side of line. The shifting of relay contact 554 interrupted all of those circuits, thereby darkening the lamp 528 and de-energizing the electromagnets 524 and 526; and thereupon, the armatures of those electromagnets enter the nickel and the dime and quarter passageways, respectively, to prevent the acceptance of further coins.

The nickel will pass downwardly below the level of the slot 122 and thereby free the switch actuator 270, and the spring within the switch 268 will return that actuator to the position shown in FIG. 2. At such time, the movable contact of switch 268 will return to the position shown in FIG. 32 to complete a circuit which starts at the right side of line, extends through connector posts 548, through the movable and upper contacts of switch 268, through connector posts 546, through relay contacts 558 and 560 and through the electromotive device 564 to the left side of line. This circuit initiates a cycle of the vending machine; and at the conclusion of that cycle, the delivery switch 562 will open and break the holding circuit of relay 550. At such time the contacts 554 and 560 will return to the positions shown by FIG. 32, thereby de-energizing the electromotive element 564 of the venting machine and reestablishing the circuits to the lamp 528 and to the electromagnets 524 and 526. It will be noted that when a nickel is inserted, the motor 192 of the change-making device is not energized; the switch 268 merely initiating a cycle of the vending machine.

The nickel will try to pass between the upstanding ears 498 of the coin guide 492 and to pass through the slot 496 and enter coin reservoir 486; and unless that coin reservoir is full, the nickel will do so. If that nickel can move wholly below the bottom of the slot 496 in coin guide 492, that nickel will lay on its side, but if that nickel can not move wholly below the bottom of the slot 496, it will come to rest with its edge resting on the second uppermost nickel in the coin reservoir. If the coin reservoir is full when the nickel attempts to pass between the upstanding ears 498, that nickel will engage the upper edge of the uppermost nickel in the coin reservoir and be deflected toward the pin 366. That pin will guide that nickel to the space between the bosses 362 and 364, and thereafter that nickel will fall downwardly into the accepted coin chute 140. In being directed toward the coin guide 492, the nickel was given a chance to replenish the supply of change in the coin reservoir 486; and only when that coin reservoir is full will that nickel be deflected toward the accepted coin chute.

When a dime is inserted it will pass through the slug rejector 510 and enter the dime passageway defined by the walls 336 and 346. That dime will move downwardly between the vertical bosses 248 and 350, and it will experience some lateral movement as it passes the cusps defined by those bosses. That dime will successively engage the switch actuators 270 and 266; and it will move the actuator 270 downwardly and then release it, much in the manner in which the nickel did so. In this way, the dime will cause the vending machine to cycle in the same way in which the nickel caused that machine to cycle. In moving the switch actuator 266 downwardly toward the lower end of slot 124, the dime will shift the movable contact of switch 264 from its upper to its lower position on FIG. 32; and thereupon a circuit will be completed which starts at the right side of line, extends through connector posts 548, through motor 192, through the lower and movable contacts of switch 264, and through connector posts 536 to the left side of line. That circuit energizes motor 192 and starts the output shaft 194 rotating in the counter-clockwise direction. The coin-blocking portion 328 of the coin-responsive element 326 will intercept and hold the dime while that dime is holding actuator 266 adjacent the lower end of slot 124, and this means that the dime will hold the motor 192 energized as long as the element 326 remains in its "at rest" position.

The cam will rotate with the shaft 194, but the initial rotation of that cam will not affect the positions of the slides 418 and 440; the rollers 430 and 452 on those slides engaging the concentric portions 205 and 212, respectively, of the cam section 196 and 208. However, that initial rotation of the cam will quickly move the rise 220 of cam section 218 into engagement iwth the roller 242 on lever 234; and that engagement will rotate lever 234 in the clockwise direction, thereby permitting lever 250 to rotate downwardly against the stud 158. As lever 250 engages the stud 158, the pin-like projection 256 on that lever will move into position to hold switch actuator 266 adjacent the lower end of slot 124 and thereby hold the movable contact of switch 264 against its lower contact.

Further rotation of the cam will move the rise 207 on cam section 196 into engagement with roller 430 on slide 418, and that engagement will shift slide 418 a short distance to the right. That shifting will cause pin 434 to engage the camming surface 288 on latch 282 and rotate that latch, and the coin-responsive elements 312 and 326 in the counter-clockwise direction. That rotation will be sufficient to move the coin-blocking portion 328 of element 326 out of the dime passageway but it will not be sufficient to move the coinblocking portion 320 of element 312 out of the quarter passageway; and it will not be sufficient to move the coin-feeding and coin-holding portions of the elements 326 and 312 out of those passageways. During that rotation, the dime will fall downwardly and will engage and be held by the inclined face of element 326. That inclined face is both a coin-feeling portion and a coin-holding portion. In moving downwardly, the dime freed the switch actuator 266, but that actuator can not return to its "at rest" position because the projection 256 on lever 250 blocks upward movement of that actuator. Hence the motor will remain energized although the dime has freed the switch actuator 266.

Further counter clockwise rotation of the cam enables the concentric portion of the dwell, following the rise 207 on cam section 196, to hold the coin-blocking portions 328 and 320 of the elements 326 and 312 out of the dime and quarter passageways, respectively, as by engaging roller 430 on slide 418 and preventing movement of that slide to the left; and thus that rotation provides ample time for the dime to move into position adjacent the inclined face of elements 326. Additional counter clockwise rotation of the cam causes the gradual fall, that precedes the abrupt fall 209, to engage roller 430 and permit the slide 418 to move gradually to the left; and that movement enables the latch 282 and the coin-responsive elements 326 and 312 to start rotating in the clockwise direction. Almost immediately, however, the dime will block such clockwise movement; that dime being held against movement to the right by the vertical boss 348 and acting to resist right-hand movement of the inclined face of element 326. As a result, the latch 282 will have the notch 290 thereon held above, and out of the path of, the pin 434 on slide 418.

Continued counter clockwise rotation of the cam causes the abrupt fall 209 of cam section 196 to pass beyond the roller 430 on slide 418 and causes the reduced diameter portion 211 to move into register with the roller 430; and thereupon, the spring 506 will pull slide 418 to its extreme left-hand position, that slide thereby carrying one nickel to the coin-discharging opening 416 in the base plate 390. The resilient pad 408 will cushion the stopping of the slide 418. The slide 440 will be unable to move to the left at this time because the long dwell 212 will be engaging the roller 452 on that slide and will prevent such movement.

Further rotation of the cam in the counter clockwise direction will move the rise 198 of cam section 196 into engagement with the roller 430 on slide 418, thereby driving that slide toward the right-hand end of its path of reciprocation. Shortly before the rise 198 has moved the opening 422 of slide 418 into register with the opening 446 of slide 440, the fall 222 of cam section 218 moves beyond the roller 242 on lever 234. That movement permits the lever 234 to rotate in the counter-clockwise direction and to place its roller 242 against concentric portion 223; and that counter-clockwise rotation of lever 234 moves pin 248 toward the left-hand end of slot 254 in lever 250. However the pin 248 does not move far enough to cause the slot 254 to rotate the lever 250 in the counter-clockwise direction; and that latter lever remains in abutting engagement with the stud 158. Hence, the fall 222 on the cam section 218 does not change the position of the movable contact of switch 264; instead, it merely obstructs clockwise rotation of shaft 194. If it were not for the fall 222, a patron could pull the male plug from the wall socket just as the opening 422 of slide 418 moved into register with the opening 446 of the slide 440, and he could thereby oscillate the slide 418 between its coin-receiving and coin-discharging positions until the coin reservoir 486 was emptied of nickels. That oscillation could occur, if the fall 222 were not provided, because the rise 198 stretches the spring 506 as it moves the slide 418 to coin-receiving position, and if the motor were then de-energized, that spring could pull the opening 422 of slide 418 back to coin-discharging position. However, the fall 222 will block the returning action of the spring 506 by blocking clockwise rotation of the cam.

Continued counter-clockwise rotation of the cam will cause the rise 198 to move slide 418 far enough to the right to enable pin 434 on that slide to engage camming surface 288 on latch 282 and thereby again rotate the elements 326 and 312 in the counter-clockwise direction. The outermost portion of rise 198 is more distant from the axis of shaft 194 than is the outermost portion of rise 207, and hence the rise 198 will rotate element 326 far enough to move the inclined face thereof out of the dime passageway, and will rotate the element 312 far enough to move its coin-blocking portion 320 out of the quarter passageway while leaving its coin-holding portion 324 in that passageway. At this time, the dime will fall downwardly to the accepted coin chute 140.

Continued rotation of the cam in the counter-clockwise direction will enable the concentric portion of the dwell immediately behind the rise 198 to hold the inclined face of element 326 out of the dime passageway and to hold the coin-blocking portion 320 of the element 312 out of the quarter passageway. Thereafter, the gradual fall that precedes the abrupt fall 200 will permit the slide 418 to move gradually to the left. That gradual movement of the slide 418 will enable the camming surface 288 to move downwardly, in gradual fashion, relative to the pin 434 on slide 418; and thereupon the elements 326 and 312 will move toward their "at rest" positions and the notch 290 will move into the path of the pin 434. As the trailing edge of the gradual fall, that precedes the abrupt fall 200, is about to pass beyond the roller 430 of slide 418, the pin 434 on that slide will engage and be held by the notch 290 on the latch 282. As a result, although further counter-clockwise rotation of the cam will cause the abrupt fall 200 to move beyond the roller 430 and will cause the reduced diameter portion 201 to be in register with that roller, the slide 418 can not move to coin-discharging position.

About the time the rise 198 of the cam section 196 passes beyond the roller 430 on slide 418, the gradual rise 224 of cam section 218 engages roller 242 on lever 234. About the time the abrupt fall 200 passes beyond the roller 430 on slide 418, the gradual fall 213 on cam section 208 engages roller 452 on slide 440, and the gradual rise 224 of cam section 218 is still engaging roller 242 on lever 234. The engagement of the gradual fall 213 with the roller 452 will enable the slide 440 to move to the left until the right-hand end of the slot 462 of that slide engages and is held by the notch 436 in the upright support 432 of slide 418. That engagement prevents coin-discharging movement of the slide 440 even though continued counter-clockwise rotation of the cam moves the abrupt fall 214 of cam section 208 beyond the roller 452 on slide 440.

About the time the abrupt fall 214 passes beyond the roller 452 on slide 440, the outermost portion of the rise 224 engages the roller 242 on lever 234. That engagement moves the pin 248 toward the right-head end of the slot 254 in the lever 250, but it does not affect the position of that lever; instead, the lever 250 continues to remain in abutting engagement with the stud 158. This means that the movable contact of switch 264 will continue to remain in engagement with the lower contact of that switch and will continue to supply energizing current to the motor.

Continued counter-clockwise rotation of the cam will cause the abrupt fall 226 to pass beyond the roller 242 on the lever 234; and this occurs shortly before the rise 202 of the cam section 196 engages the roller 430 on slide 418. If the two slides 418 and 440 had been freed for movement to their coin-discharging positions, as by the insertion of a quarter, the abrupt fall 226 would pass beyond the roller 242 shortly before the rise 202 moves the opening 446 of slide 440 into register with the coin reservoir 486. As the abrupt fall 226 moved beyond the roller 242, the lever 234 again rotated in the counter clockwise direction and again moved the pin 248 toward the left-hand end of the slot 254 in lever 250. Once again, however, the movement of the pin 248 will not be great enough to cause counter-clockwise rotation of the lever 250; and that lever will remain in abutting relation to the stud 158, thereby continuing to hold the movable contact of switch 264 in motor-energizing position. The real value of the fall 226 is to prevent clockwise rotation of the cam, and hence returning movement of the slides 418 and 440 to coin-discharging position, after the rise 202 has moved those slides to coin-receiving position.

Further counter-clockwise rotation of the cam will move the rise 202 into engagement with the roller 430 on slide 418, and that engagement will shift that slide to the right. The outermost portion of the rise 202 is spaced farther from the axis of shaft 194 than is the outermost portion of the rise 198, and hence the rise 202 will rotate the latch 282 and the elements 326 and 312 even further in the counter-clockwise direction. That rotation is sufficient to move the coin-holding portion 324 of the coin-responsive element 312 out of the quarter passageway.

The rise 202 has such a large radial value that the notch 436 in the upright support 432 of slide 418 will engage the right-hand end of slot 462 in slide 440 and move that latter slide to the right. As the outermost portion of the rise 202 passes beyond the roller 430 on slide 418, the roller 452 on slide 440 will be held to the left of, and out of engagement with, the rise 210 of cam section 208. However, continued counter-clockwise rotation of the cam will cause the concentric dwell, behind the rise 202, to pass beyond the roller 430 on slide 418; and still further counter-clockwise rotation of the cam will cause the gradual fall 204 to engage the roller 430. That fall will permit the slide 418 to move gradually to the left; and that movement will permit the slide 440 to move its roller 452 against the dwell 212 on cam section 208 and permit the notch 290 on latch 282 to move into the path of, and to engage and hold, the pin 434 on slide 418.

As the shaft 194 approaches the end of a revolution, the gradual fall 204 will be moving past the roller 430 on slide 418, and the dwell 227 and the abrupt fall 228 will be passing by the roller 242 on lever 234. When the reduced diameter concentric portion 229 of the cam section 218 moves into register with the roller 242, the lever 234 will rotate in the counter-clockwise direction and will move the pin 248 against the left-hand end of the slot 254 in lever 250. That pin will coact with that end of the slot to rotate the lever 250 in the counter-clockwise direction until the pin-like projection 246 thereon engages the upper edge of the opening 150 in the wall portion 102. At this time, the actuator 266 of the switch 264 is free to return to its "at rest" position, and it does so, thereby de-energizing he motor 192.

When a quarter is inserted, it will pass through the slug rejector 510 and enter the passageway defined by the walls 102 and 336. In passing downwardly through that passageway, the quarter will pass between the bosses 126 and 132 and will engage and rotate the switch actuator 270 as it does so. In rotating that actuator, the quarter will initiate a cycle of the vending machine in the manner described above. The quarter will continue to move downwardly and will pass between the bosses 128 and 134; and in doing so it will move the switch actuator 266 downwardly in the slot 124. The coin-blocking portion 320 of the coin-responsive element 312 will intercept the quarter and will hold that quarter in position to hold the actuator 266 adjacent the lower end of slot 124. This means that the quarter can energize the motor 192 and can hold that motor energized.

The energization of the motor 192 will cause the output shaft 194 to rotate in the counter-clockwise direction; but the initial rotation of that shaft will not affect the position of the slides 418 and 440, because the concentric portion 205 of cam section 196 will engage the roller 430 on slide 418 and hold that slide against movement and the long concentric dwell 212 on cam section 208 will engage the roller 452 on slide 440 and hold that slide against movement. However, the initial rotation of the cam will cause the rise 220 on cam section 218 to engage the roller 242 on lever 234 and rotate that lever in the clockwise direction. Such rotation of lever 234 will free the pin 248 of that lever from its engagement with the left-hand end of the slot 254 in lever 250, thereby permitting the latter lever to rotate in the clockwise direction until it comes to rest on the stud 158. In moving down into engagement with the stud 158, the lever 250 causes the pin-like projection 256 thereon to move down into position to overlie and hold the actuator 266 of the switch 264, thereby causing that switch to keep the motor 192 energized.

Further counter-clockwise rotation of the cam will place the rise 207 of cam section 196 in engagement with the roller 430 on the slide 418, and that engagement will cause the pin 434 on slide 418 to coact with the camming face 288 on latch 282 to rotate that latch in the counter-clockwise direction. That rotation of the latch 282 will cause counter-clockwise rotation of the coin-responsive elements 312 and 326; and while that latter rotation is sufficient to move the coin-blocking portion 328 of the element 326 out of the dime passageway, it is not sufficient to move the coin-blocking portion 320 of the element 312 out of the quarter passageway. Hence, the quarter will remain in position atop the coin-blocking portion 320 of the element 312. The coin-responsive elements 326 and 312 will remain in these positions for the length of the concentric dwell following the rise 207, or approximately fifteen degrees of rotation of the cam; and then they will start to rotate in the clockwise direction as the gradual fall, which precedes the abrupt fall 209, engages the roller 430 and permits the slide 418 to move to the left. This movement of slide 418 permits the coin-responsive elements 326 and 312, as well as the latch 282, to rotate in the clockwise direction; and the rotation of the latch 282 will enable the notch 290 on that latch to engage and hold the pin 434 on the slide 418. Consequently, when the said gradual fall, and then the abrupt fall 209, pass beyond the roller 430 on the slide 418, the slide 418 will not be free to move to coin-discharging position. This means that during the time the concentric portion 211 of the cam section 196 is in register with the roller 430 of slide 418, that slide will be held against coin-discharging movement.

Continued rotation of the cam in the counter-clockwise direction will move the rise 198 toward the roller 430 on the slide 418, but before that rise can engage that roller, the dwell 221 and the fall 222 of cam section 218 will pass beyond the roller 242 on lever 234. Thereupon, the lever 234 will rotate in the counter-clockwise direction and will move the pin 248 toward the left-hand end of the slot 254 in lever 250; but that movement of pin 248 is not sufficient to cause counter-clockwise rotation of lever 250, and hence that lever will continue to hold the movable contact of switch 264 in motor-energizing position. As in the case of the dime operation, the principal value of the fall 222 is to prevent clockwise rotation of the output shaft 194.

During the dime operation of the change-making device, the movement of the abrupt fall 209 past the roller 430 of slide 418 permitted that slide to move to coin-discharging position. This means that the roller 430 was in coin-discharging position when it was engaged by the rise 198 of cam section 196, during the dime operation; but that roller will be in its "at rest" position when it is engaged by the rise 198. Consequently, while the necessarily differing descriptions of the dime and quarter operations of the change-making device may seem to indicate that the fall 222 of cam section 218 passes beyond the roller 242 at different times in the rotation of cam section 196, that fall passes beyond the roller 242 at a fixed and determinable time in the rotation of cam section 196.

Continued rotation of the cam in the counter-clockwise direction will move the rise 198 into engagement with the roller 430 on the slide 418, and that engagement will shift the slide 418 to the right. This will cause the pin 434 on that slide to engage the camming surface 288 of latch 282 and rotate that latch and the coin-responsive elements 326 and 312 in the counter-clockwise direction until the coin-blocking portion 320 of the element 312 is moved out of the quarter passageway. Thereupon, the quarter will fall downwardly until it engages and is held by the coin-holding portion 324 of the element 312. In moving downwardly, the quarter will free the switch actuator 266, but that actuator will be held against returning to its "at rest" position by the pin-like projection 256 on lever 250; and therefore the switch 264 will continue to have its movable contact held in motor-energizing position. As the coin-blocking portion 320 of the element 312 was moved out of the quarter passageway, the coin-feeling and coin-holding portions of the element 326 were moved wholly out of the dime passageway; but since a quarter rather than a dime was inserted, the movement of the element 326 did not release a coin.

Continued rotation of the cam in the counter-clockwise direction will cause the concentric dwell behind the rise 198 to engage the roller 430 and thereby hold the latch 282 and the elements 326 and 312 in rotated position, thereby giving the quarter ample time to move into engagement with the coin-holding portion 324 of element 312. Further counter-clockwise rotation of the cam will move the gradual fall, that precedes the abrupt fall 200, into engagement with the roller 430; and that engagement will permit the slide 418 to move to the left. The movement of that slide will permit the latch 282 and the elements 326 and 312 to rotate in the clockwise direction; but the clockwise rotation of the element 312 will terminate rather quickly as the coin-feeling portion 322 of that element engages and is stopped by the quarter. At this time, the element 312 will hold the latch 282 so the notch 290 thereon is out of register with the pin 434 on the slide 418; and as still further counter-clockwise rotation of the cam causes the abrupt fall 200 to pass beyond the roller 430 on the slide 418, the slide 418 will move to coin-discharging position and carry a nickel over into register with the discharge opening 416 in the base 390.

As the rise 198 started to move the roller 430 on the slide 418, the gradual rise 224 on cam section 218 began to move the roller 242 and the lever 234 in the clockwise direction. That latter movement is quite gradual, and by the time the abrupt fall 200 has passed beyond the roller 430, the outermost portion of the rise 224 has not passed beyond the roller 242 on the lever 234.

About the time the abrupt fall 209 is passing beyond the roller 430 on slide 418, the gradual fall 213 on the cam section 208 is engaging the roller 452 on the slide 440. That fall permits the slide 440 to move gradually to the left; and as the cam continues to rotate in the counter-clockwise direction, the abrupt fall 214 passes beyond the roller 452 and permits the slide to move to coin-discharging position, thereby carrying three nickels into register with the opening 416 in the base plate 390. It will be noted that the slide 418 moved before the slide 440 moved; and this is desirable since it isolated any thickness variations of the nickel carried by the slide 418 from the thickness variations of the three nickels carried by the slide 440.

During the time the concentric portion 201 of cam section 196 is in register with the roller 430, the gradual rise 224 and the concentric dwell 225 of cam section 218 is in engagement with the roller 242 on the lever 234. That engagement rotates the lever 234 in the clockwise direction and moves the pin 248 toward the right-hand end of the slot 254 in lever 250. However that movement does not change the position of the lever 250 or of the movable contact of switch 264. The lever 234 will remain in clockwise position until the rise 202 of cam section 196 has engaged the roller 430 of slide 418 and has started moving that slide toward its right-hand position. Thereupon, the abrupt fall 226 of cam section 218 will pass beyond the roller 242 and permit that roller to engage the dwell 227. The resulting counter-clockwise rotation of the lever 234 will not change the position of the lever 250 or of the movable contact of switch 264; but it will prevent clockwise rotation of the cam.

Continued counter-clockwise rotation of the cam will cause the rise 202 to move the slide 418 to the right, and that slide will cause the slide 440 to move with it. The outermost portion of the rise 202 is spaced further from the axis of the shaft 194 than is the outermost portion of the rise 198, and hence the rise 202 will cause the camming surface 288 on latch 282 to rotate the coin-responsive element 312 far enough in the counter-clockwise direction to move the coin-holding portion 312 of that element completely out of the quarter passageway. Thereupon, the quarter will fall downwardly to the accepted coin chute 140.

Further counter-clockwise rotation of the cam will cause the concentric dwell behind the rise 202 to hold the coin-responsive element 312 in quarter-freeing position; and subsequently, the gradual fall 204 will engage the roller 430 on the slide 418 and permit that slide to move a short distance to the left. As the slide 418 moves to the left it will permit the slide 440 to move to the left until the roller 452 thereon engages the long dwell 212 on the cam section 208. Prior to the time the gradual fall 204 moves out of engagement with the roller 430 on the slide 418, the camming surface 288 on latch 282 will have permitted that latch to rotate into position where the notch 290 is in the path of the pin 434 on the slide 418. Just about the time the gradual fall 204 is moving out of engagement with the roller 430 on the slide 418, the fall 228 on the cam section 218 is passing out of engagement with the roller 242 on the lever 234; and thereupon the lever 234 will rotate in the counter-clockwise direction and will cause its pin 248 to engage the left-hand end of the slot 254 in lever 250; and that engagement will rotate that lever to the position shown in FIG. 4. Thereupon the switch actuator 266 can return to its upper position, and as it does so it will de-energize the motor 192.

In the operation of the change-making device provided by the present invention, there is a direct and immediate relationship between the presence of a coin in the dime or quarter passageway and the paying out of change. This direct relationship provides a high degree of certainty and reliability for the operation of that change-making device. In addition, that direct relationship reduces the number of switches, that are needed, to a minimum.

The change-making device shown in FIGS. 1–29 calls for a sales price of five cents; but that device can readily be modified to call for a sales price of ten cents. To enable the change-making device of FIGS. 1–29 to call for a ten cent sales price, the cam section 196 is omitted, the cam section 208 is replaced by a cam section 570, the connecting rod 302 is rotated one hundred and eighty degrees about its long axis, the spacer 292 is disposed forwardly of rather than rearwardly of the hub 284 of latch 282, the coin-responsive element 326 is omitted, the forward end of the foot of switch actuator 266 is cut so it does not extend into the dime passageway, the L-shaped bracket 274 is shifted to the left approximately seventy-five thousandths of an inch, and a "flipper" is disposed at the top of the nickel passageway. The cam section 570 is shown in FIG. 30; and that cam section has a concentric portion 572, a short rise 574, a short concentric section 576, a gradual fall 578, an abrupt fall 580, a concentric portion 582 of reduced diameter, an abrupt rise 584, a large diameter concentric portion 586, a gradual fall 588, an abrupt fall 590, a concentric portion 592 of reduced diameter, an abrupt rise 594, a short concentric portion 596, and a gradual fall 598. That cam section is in register with, and can drive, the roller 452 on slide 440.

The rotation of the connecting rod 302 about its long axis, and the disposition of the spacer 292 forwardly of rather than rearwardly of the hub 284 of latch 282, make it possible for the camming surface 288 and the holding notch 290 of that latch to be disposed in register with the pin 460 of slide 440 rather than in register with the pin 434 of slide 418. This is desirable because it provides direct and immediate control of the slide 440 and permits the slide 418 to remain stationary. The omission of the element 326 permits the dimes to pass through the dime passageway without any need of energizing the motor 192, and the foot of actuator 266 is cut to keep the dimes from shifting the movable contact of switch 264. The "flipper," which is of standard and usual construction, alternately directs nickels to the left of, and to the right of, the inclined boss 358 on partition 346; and in doing so it permits only every other nickel to move the switch actuator 268 through the slot 122. In doing so, that "flipper" requires the patron to insert two nickels, rather than just one nickel, to initiate a cycle of the vending machine. The shifting of the L-shaped bracket 274 compensates for the smaller radii of the rises of cam section 570.

The spacer 292 is long enough so when it is disposed rearwardly of the hub 284 of latch 282, the notch 290 and the camming surface 288 of the latch 282 are in register with the pin 430 of the slide 418; and so when it is disposed forwardly of the hub 284, the notch 290 and the camming surface 288 of latch 282 are in register with pin 452 on slide 440. The position of the spacer 292 is readily changed; it merely being necessary to remove the C-washers 277, 304 and 327, to set the connecting rod so its pin 300 extends rearwardly rather than forwardly, and to replace those C-washers.

When the change-making device of the present invention is modified to call for a ten cent sales price, the slide 418 is not held by the latch 282 and there is no cam section to hold that slide. Hence the slide 418 will respond to its spring 506 to move toward and to rest against the resilient pad 408. At such time, the opening 422 in that slide is in register with the discharge opening 416 of the base plate 390, and the slide 418 serves, in effect, as a thickening of that base plate.

To shift the L-shaped bracket 274 to the left, the set screw 278 is loosened and the adjusting screw 280 is rotated approximately two and one half turns. The change-making device is then cycled by hand to make sure that the coin-responsive element 312 can move freely without being obstructed by an adjacent part of the change-making device; and if a fine adjustment of the position of the screw 280 is needed it can be made. Thereafter, the set screw 278 is tightened to lock the L-shaped bracket 274 against accidental shifting.

When a nickel is inserted in the modified change-making device, that nickel will engage the "flipper" and will be directed by that "flipper" to the left of the inclined boss 358 on the partition 346; and that nickel will not engage the switch actuator 270 of switch 268. As that nickel leaves the "flipper" it will cause that "flipper" to shift to a position that will enable that "flipper" to direct a second nickel between the bosses 356 and 358 on the wall 346. As a result, that second nickel will move the switch actuator 270 and initiate a cycle of the vending machine. As that second nickel leaves the "flipper" it will shift that "flipper" to a position where that "flipper" will direct a third nickel to the left of the boss 358. In this way, the "flipper" will direct the odd-numbered nickels away from the switch actuator 270 and will direct the even-numbered nickels toward that actuator. In this way, the "flipper" requires the patron to insert the full sales price before a cycle of the vending machine is initiated.

When a dime is inserted, that dime will strike the switch actuator 270 and thereby initiate a cycle of the vending machine. That dime will move downwardly past the slot 124 but it will not engage the switch actuator 266 because the forward end of the foot of that actuator has been cut short so it does not extend into the dime passageway. Because the coin-responsive element 326 has been omitted, the dime can fall directly to the accepted coin chute 140.

When a quarter is inserted, that quarter will engage the switch actuator 270 and it will engage and hold the switch actuator 266, all as described above. The switch actuator 266 will shift the movable contact of switch 264 and thereby energize the motor 192; and that motor will rotate the cam in the counter-clockwise direction. The initial rotation of the cam will not affect the slide 440 because the roller 452 on that slide engages and is held by the concentric portion 572 of the cam section 570. However, that initial rotation of the cam will cause the rise 220 of cam section 218 to engage the roller 242 and rotate the lever 234 in the clockwise direction. That rotation will cause the pin 248 to move toward the right-hand end of slot 254 in lever 250, thereby permitting that lever to rotate in the clockwise direction until it engages and is held by the stud 158. That rotation of lever 250 places the pin-like projection 256 of that lever in position to hold the movable contact of switch 264 in motor-energizing position.

Continued counter-clockwise rotation of the cam will move the short rise 574 of cam section 570 into engagement with the camming surface 288 of latch 282 and will rotate that latch and the coin-responsive element 312 in the counter-clockwise direction. Because of the shifting of the L-shaped bracket 274 to the left, the pivot 275 for the latch 282 is in such a position that the short rise 574 is able to move the coin-blocking portion 320 of the element 312 out of the quarter passageway. It will be noted that prior to the shifting of the L-shaped bracket to the left, the larger radius short rise 207 of cam section 196 was not able to move the coin-blocking portion 320 of the element 312 out of the quarter passageway. Thereupon, the quarter will move downwardly into engagement with the holding portion 324 of the element 312.

The coin-responsive element 312 will continue to have its coin-blocking portion 320 held out of the quarter passageway for approximately fifteen degrees, as the concentric portion 476 engages and holds the roller 452 on the slide 440. Thereafter, the gradual fall 578 will engage roller 452 and permit the slide 440 to move to the left, and that movement will cause the coin-feeling portion 322 of element 312 to engage the quarter and urge that quarter against the flange 110 of frame 100. The quarter will limit the clockwise rotation of the element 312 and of the latch 282, and it will hold the notch 290 of that latch above and out of the path of pin 460 on slide 440. As a result, when the abrupt fall 580 moves beyond the roller 452 on slide 440, that slide will move to the left-hand end of its path of reciprocation and it will carry three nickels into register with the alined openings 422 and 416 of the slide 418 and the base plate 390.

Continued counter-clockwise rotation of the cam will cause the reduced diameter concentric portion 582 to pass beyond the roller 452 on the slide 440 and will move the abrupt rise 584 into engagement with that roller. That rise will coact with that roller to move the slide 440 toward the right-hand end of its path of reciprocation. Shortly before the opening 446 in the slide 440 moves into register with the coin reservoir 486, the fall 222 on the cam section 218 passes beyond the roller 242 on the lever 234. Thereupon the lever 234 rotates in the counter-clockwise direction and moves the pin 248 thereon toward the left-hand end of the slot 254 in lever 250. However, that rotation is not extensive enough to rotate the lever 250 in the counter-clockwise direction; instead, that lever remains adjacent the stud 158 and continues to hold the movable contact of switch 264 in motor-energizing position. The principal value of the fall 222 is to prevent clockwise rotation of the cam after the opening 446 of slide 440 has moved into registry with coin reservoir 486 and accepted three nickels.

The abrupt rise 584 will continue to move the slide 440 to the right until the pin 460 on that slide again engages the camming face 288 of latch 282 and rotates that latch in the counter-clockwise direction. The outermost portion of the rise 584 has a radius that is great enough to cause the latch 282 to rotate the coin-holding portions 324 of element 312 wholly out of the quarter passageway; and thereupon the quarter will fall downwardly to the accepted coin chute 140. The slide 440 will continue to remain in quarter-freeing position for approximately fifteen degrees as the concentric portion 586 engages and holds the roller 452 on that slide; but thereafter the gradual fall 588 will engage the roller 452 and permit the slide 400 to move slowly to the left. As that slide moves to the left, the latch 282 will rotate in the clockwise direction and place its notch 290 in register with the pin 460 on the slide 440. This means that when the gradual fall 588 permits the pin 460 of slide 440 to move adjacent the notch 290 of latch 282, that pin will be caught and held by that notch. Consequently, although the abrupt fall 590 and the reduced diameter portion 592 pass beyond the roller 452 on slide 400, that slide will not be able to move to coin-discharging position.

As the gradual fall 588 moved into engagement with the roller 452, the gradual rise 224 on cam section 218 moved into engagement with the roller 242 on lever 234. That latter engagement slowly rotates the lever 234 in the clockwise direction, and about the time the abrupt fall 590 passes beyond the roller 452, the outermost portion of rise 224 is engaging the roller 242. The rise 224 will have rotated the pin 248 on lever 234 toward the right-hand end of slot 254 in lever 250, but that rotation will not have shifted the position of that latter lever.

Shortly before the rise 594 engages the roller 452 on slide 400, the fall 226 on cam section 218 will pass beyond the roller 242 on lever 234, thereby permitting that lever to rotate in the counter-clockwise direction. The resulting movement of the pin 248 in the slot 254 of lever 250 does not change the position of that lever and that lever will continue to hold the movable contact of switch 264 in motor-energizing position. However, the fall 226 will act to prevent clockwise rotation of the cam after the slide 440 has accepted three nickels from the coin reservoir 486.

Continued counter-clockwise rotation of the cam will cause the abrupt rise 594 to engage the roller 452 on the slide 440 and move that slide to the right until it rotates the latch 282 and the element 312 in the counter-clockwise direction. The outermost portion of the rise 594 is not as distant from the axis of shaft 194 as is the outermost portion of rise 584; but the rise 594 can cause the coin-blocking portion 320 of element 312 to move out of the quarter passageway and it can cause the notch 290 of latch 282 to move out of the path of pin 460 on slide 440. The latch 282 and the element 312 will remain in counter-clockwise position as the concentric dwell 596 engages and holds the roller 452 on slide 440, but that latch and that element will begin to rotate in the clockwise direction as the gradual fall 598 engages the roller 452 and lets the slide 440 move to the left. The clockwise rotation of the latch 282 will place the notch 290 thereof adjacent the pin 460 on the slide 440.

About the time the gradual fall 598 moves out of engagement with the roller 452 on the slide 440, the fall 228 of cam section 218 will pass beyond the roller 242 on lever 234 and permit the reduced diameter concentric portion 229 to move into register with that roller. Thereupon, the lever 234 will move in the counter-clockwise direction and will move its pin 248 against the left-hand end of the slot 254 in lever 250, thereby returning the lever 250 to the position shown in FIG. 4. At this time, the switch actuator 266 is free to return to its "at rest" position, and it will do so and de-energize the motor 192. During the revolution of the cam, the slide 440 moved to coin-discharging position and delivered three nickels, the correct amount of change, to openings 422 and 416 in slide 418 and base plate 390.

As indicated above, the thicknesses of nickels can vary a good deal. The present invention avoids any difficulties in the paying-out of nickels, regardless of their thickness variations, by moving the single-coin slide 418 before the multi-coin slide 440 moves, and also by coining down the coin-moving edges of openings 422 and 446. The movement of slide 418 in advance of the movement of slide 440 isolates the effect of any thickness variation of the nickel in that slide from the thickness variations in the nickels in the slide 440. A large number of change-making devices made in accordance with the principles and teachings of the present invention have already been marketed, and the practicability of the multi-slide operation of the present invention has been thoroughly established.

The coining down of the coin moving edges of openings 422 and 446 in slides 418 and 440 forms inclined surfaces that raise the nickels in the coin reservoir 486. Such raising can occur without jamming or without difficulty because the coin guide 492 is free to rotate relative to that coin reservoir. Hence, any tendency to jam is eliminated.

Whenever it is desired to empty the coin reservoir 486, as for example in taking inventory of the nickels in that reservoir, the operator of the vending machine will shift the handle 380 of the switch 378 to the right. Shifting of that handle to the right will close the switch 378 and will also cause the latch 388 to move its hook 397 under the pin 286 on latch 282 and thereby hold the notch 290 on that latch out of register with the pin 434 or 460 of slide 418 or slide 440, as the case may be. As indicated by FIG. 32, the closing of switch 378 places the motor 192 directly across the line, and that motor will continue to rotate until the handle 380 is returned to its left-hand position. Because the notch 290 on the latch 282 is held above and out of register with the pin 434 or the pin 460, the slides 418 and 440 will pay out nickels whenever the abrupt falls of the cam sections 196, 208 or 570 move out of engagement with the rollers 430 and 452 on those slides. In the modification shown in FIGS. 1–29, the cam sections 196 and 208 will pay out four nickels during each revolution of the shaft 194, whereas in the modification shown in FIGS. 30 and 31 the cam section 572 will pay out two sets of three coins during each revolution of the shaft 194, or a total of six coins for each such revolution. The first set of three coins will be paid out when the fall 580 passes beyond the roller 452 on the slide 440, and the second set of three coins will be paid out when the fall 590 passes beyond that roller.

The gradual falls that precede the abrupt falls 209 and 200 of cam section 196, the gradual fall 204 of that section, the gradual fall 213 of cam section 208, and the gradual falls 578, 588 and 598 of cam section 570 ease the notch 290 and the pins 434 and 460 toward each other. The gradual nature of the relative movement of notch 290 and pins 434 and 460 is important because it makes certain that the notch 290 will not miss one of those pins when it is supposed to engage and hold it. Further, that gradual movement is helpful in preventing wearing of that notch.

The pad 408 of resilient material minimizes wearing of the parts of the change-making device, and it also absorbs the kinetic energy of the slides 418 and 440. That pad is engaged by the left-hand end of slide 418 and by a downwardly bent ear 441 adjacent the left-hand end of the slide 440. Thus the stopping of each slide is cushioned individually by the pad 408.

In the event the supply of nickels in the coin reservoir 486 were to fall too low, as the result of a change-making cycle, the feeler 520 wound enter the slot 490 in the rear of that reservoir, thereby permitting the movable contact of switch 518 to shift from its left-hand to its right-hand contact. Thereupon the "at rest" circuits of lamp 528 and of electromagnet 526 will be broken and the "at rest" circuit of the lamp 530 will be established; that latter circuit starting at the left side of line, extending through connector posts 536, through the movable and upper contacts of switch 264, through the movable and right-hand contacts of switch 518, through connector posts 542, through lamp 530, through the movable and right-hand contacts of switch 534, through relay contacts 556 and 554, and through delivery switch 562 to the right side of line. The establishment of this circuit illumines the lamp 530 and indicates to patrons that they must insert nickels; and the breaking of the circuit of electromagnet 526 enables the armature of that electromagnet to enter the dime and quarter passageways and prevent the acceptance of dimes and quarters.

In the event the supply of product in the vending machine becomes depleted, the movable contact of switch 534 will shift from its right-hand to its left-hand contact, thereby establishing the "at rest" circuit of lamp 532 and breaking the "at rest" circuits of the lamps 528 and 530 and of the electromagnets 524 and 526. The armatures of those electromagnets will reject additionally-inserted coins and the lamp 532 will show that the vending machine is "empty."

Whereas the drawing and accompanying description have shown and described two preferred embodiments of the present invention it should be apparent to those skilled in the art that various changes may be made in the form of the invention without affecting the scope thereof.

What we claim is:

1. In a coin-operated device that can respond to the insertion of coinage to pay out coins, a coin passageway, a pivot, a coin-responsive element that is mounted on said pivot for rotation relative to said passageway, a coin reservoir, a coin ejector that is disposed adjacent said coin reservoir and that is movable relative to said coin reservoir to eject coins from said coin reservoir, an electromotive source of power, a cam that is driven by said source of power to move said ejector to said coin reservoir, a second pivot, a latch that is mounted on said second pivot for rotation relative to said ejector, said latch being rotatable in one direction about said second pivot to latch, and prevent movement of, said ejector and thereby prevent the paying out of coins and being rotatable in the opposite direction about said second pivot to unlatch, and free, said ejector to pay out coins, and a link that connects said coin-responsive element and said latch, said coin responsive element having a coin-blocking portion that can intercept coins in said passageway and having a coin-holding portion that can hold said coins within said passageway and having a coin-feeling portion that is movable relative to said passageway to feel for the presence of a coin in said passageway, said coin-feeling portion being disposed below the level of said coin-blocking portion and said coin-holding portion being disposed below the level of said coin-feeling portion, said link holding said coin-blocking portion in position to intercept coins in said passageway whenever said latch is in ejector-latching position, said link holding said latch in ejector-freeing position whenever said coin-feeling portion feels a coin, said coin-responsive element initially being in coin-intercepting position but responding to said source of power to move successively through its coin-holding position to its coin-feeling position.

2. In a coin-operated device that can respond to the insertion of coinage to pay out coins, a coin passageway, a pivot, a coin-responsive element that is mounted on said pivot for rotation relative to said passageway, a coin reservoir, a coin ejector that is disposed adjacent said coin reservoir and that is movable relative to said coin reservoir to eject coins from said coin reservoir, a second pivot, a latch that is mounted on said second pivot for rotation relative to said ejector, and an electromotive element to move said coin-responsive element and said latch, said latch being rotatable in one direction about said second pivot to latch, and prevent movement of, said ejector and thereby prevent the paying out of coins and being rotatable in the opposite direction about said second pivot to unlatch, and free, said ejector to pay out coins, and a link that connects said coin-responsive element and said latch, said coin-responsive element having a coin-blocking portion that can intercept coins in said passageway and having a coin-holding portion that can hold said coins within said passageway while said coin-responsive element feels for a coin in said passageway, said coin-holding portion being disposed below the level of said coin-blocking portion, said latch normally being in ejector-latching position and said coin-responsive element normally being in coin-blocking position, said electromotive element moving said latch to ejector-unlatching position and said coin-responsive element to coin-holding position, and said coin-responsive element thereafter responding to the presence of a coin in said passageway to hold said latch in ejector-unlatching position.

3. In a coin-operated device that can respond to the insertion of coinage to pay out coins, a coin passageway, a pivot, a coin-responsive element that is mounted on said pivot for rotation relative to said passageway, a coin reservoir, a coin ejector that is disposed adjacent said coin reservoir and that is movable relative to said coin reservoir to eject coins from said coin reservoir, a second pivot, a latch that is mounted on said second pivot for rotation relative to said ejector, a mechanical connection between said coin-responsive element and said latch that enables said coin-responsive element and said latch to move simultaneously, and an electromotive element to move said coin-responsive element and said latch, said latch being rotatable in one direction about said second pivot to latch, and prevent movement of, said ejector and thereby prevent the paying out of coins and being rotatable in the opposite direction about said second pivot to unlatch, and free, said ejector to pay out coins, said coin-responsive element having a coin-blocking portion that can intercept coins in said passageway and having a coin-holding portion that can hold said coins within said passageway, said latch normally being in ejector-latching position and said coin-responsive element normally being in coin-blocking position, said electromotive element moving said latch to ejector-unlatching position and said coin-responsive element to coin-holding position, and said coin-responsive element thereafter responding to the presence of a coin in said passageway to hold said latch in ejector-unlatching position.

4. In a coin-operated device that can respond to the insertion of coinage to pay out coins, a coin passageway, a pivot, a coin-responsive element that is mounted on said pivot for rotation relative to said passageway, a coin reservoir, a coin ejector that is disposed adjacent said coin reservoir and that is movable relative to said coin reservoir to eject coins from said coin reservoir, a second pivot, a latch that is mounted on said second pivot for rotation relative to said ejector, a mechanical connection between said coin-responsive element and said latch that enables said coin-responsive element and said latch to move simultaneously, and an electromotive element to move said coin-responsive element and said latch, said latch being rotatable in one direction about said second pivot to latch, and prevent movement of, said ejector and thereby prevent the paying out of coins and being rotatable in the opposite direction about said second pivot to unlatch, and free, said ejector to pay out coins, said coin-responsive element normally being in coin-blocking position but responding to said electromotive element to move to coin-holding position and thereafter responding to the presence of a coin in said passageway to remain in coin-holding position, said latch being in ejector-latching position whenever said coin-responsive element is in coin-blocking position but moving to ejector-unlatching position when said coin-responsive element moves to coin-holding position and remaining in ejector-unlatching position as long as said coin holds said coin-responsive element in coin-holding position.

5. In a coin-operated device that can respond to the insertion of coinage to pay out coins, a coin passageway, a coin-responsive element that is movable into said passageway to feel for the presence of a coin in said passageway, a coin reservoir, a coin ejector that is disposed adjacent said coin reservoir and that is movable relative to said coin reservoir to pay out coins from said coin reservoir, a latch that can latch and hold said coin ejector and thereby prevent the paying out of coins and that can unlatch and free said coin ejector to pay out coins, a mechanical connection between said coin-responsive element and said latch that enables said coin-responsive element and said latch to move simultaneously, and means adapted to move said coin-responsive element and said latch, said coin-responsive element being movable inwardly of said passageway to and beyond coin-feeling position, said connection between said coin-responsive element and said latch causing said latch to move to latching position whenever said coin-responsive element moves inwardly beyond coin-feeling position and said connection holding said latch in unlatching position whenever said coin-responsive element remains in coin-feeling position, said coin-responsive element normally being spaced from coin-feeling position but responding to said means to move to coin-feeling position and thereafter responding to the presence of a coin in said passageway to remain in coin-feeling position and thereby cause said connection between said coin-responsive element and said latch to hold said latch out of latching position, said means subsequently moving said coin-responsive element away from coin-feeling position, said coin-responsive element moving inwardly beyond coin-feeling position if a coin is not in said passageway and thereby causing said connection to move said latch to latching position, whereby the presence of a coin in said passageway enables said coin-responsive element and said connection between said coin-responsive element and said latch to determine the latch or unlatching of said ejector by said latch.

6. In a coin-operated device that can respond to the insertion of coinage to pay out coins, a coin passageway, a fixed pivot, a coin-responsive element that is mounted on said pivot for rotation relative to said passageway, said coin-responsive element being rotatable into said passageway to feel for the presence of a coin in said passageway, a coin reservoir, a coin ejector that is disposed adjacent said coin reservoir and that is movable relative to said coin reservoir to pay out coins from said coin reservoir, a cam to move said ejector relative to said coin reservoir, a second fixed pivot, a latch that is mounted on said second fixed pivot for rotation relative to said ejector, said latch being rotatable in one direction about said second fixed pivot to latch, and prevent movement of, said ejector and thereby prevent the paying out of coins and being rotatable in the opposite direction about said second fixed pivot to unlatch, and free, said ejector to pay out coins, and a link that connects said coin-responsive element and said latch and enables said latch and said coin-responsive element to move simultaneously, said link holding said latch in unlatching position whenever said coin-responsive element is in coin-feeling position, said latch being movable by said ejector to move said link and said coin-responsive element, said coin-responsive element normally being spaced from coin-feeling position but said ejector responding to movement of said cam to move said latch and link and thereby move said coin-responsive element to coin-feeling position, said coin-responsive element thereafter responding to the presence of a coin in said passageway to remain in coin-feeling position and thereby cause said link to hold said latch out of latching position, said cam subsequently moving said ejector to move said latch and said link and thereby move said coin-responsive element away from coin-feeling position, said coin-responsive element moving inwardly beyond coin-feeling position if a coin is not in said passageway and thereby causing said link to move said latch to latching position, whereby the presence of a coin in said passageway enables said coin-responsive element and said link to determine the latching or unlatching of said ejector by said latch.

7. In a coin-operated device that can respond to the insertion of coinage to pay out coins, a coin passageway, a coin-responsive element that is movable into said passageway to feel for the presence of a coin in said passageway, a coin reservoir, a coin ejector that is disposed adjacent said coin reservoir and that is movable relative to said coin reservoir to pay out coins from said coin reservoir, a latch that can latch and hold said coin ejector and thereby prevent the paying out of coins and that can unlatch and free said coin ejector to pay out coins, a mechanical connection between said coin-responsive element and said latch that enables said coin-responsive element and said latch to move simultaneously, and means adapted to move said coin-responsive element and said latch, said means normally holding said coin-responsive element in coin-blocking position in said passageway but subsequently moving said coin-responsive element outwardly of said passageway and then freeing said coin-responsive element for movement inwardly of said passageway to and beyond coin-feeding position, said connection between said coin-responsive element and said latch causing said latch to move to latching position whenever said coin-responsive element moves inwardly beyond coin-feeling position and said connection holding said latch in unlatching position whenever said coin-responsive element remains in coin-feeling position, said coin-responsive element responding to the presence of a coin in said passageway to remain in coin-feeling position and thereby cause said connection between said coin-responsive element and said latch to hold said latch out of latching position, said coin-responsive element moving inwardly beyond coin-feeling position if a coin is not in said passageway and thereby causing said connection to move said latch to latching position, whereby the presence of a coin in said passageway enables said coin-responsive element and said connection between said coin-responsive element and said latch to determine the latching or unlatching of said ejector by said latch.

8. In a coin-operated device that can respond to the insertion of coinage to pay out coins, a coin passageway, a fixed pivot, a coin-responsive element that is mounted on said pivot for rotation relative to said passageway, said coin-responsive element being rotatable into said passageway to feel for the presence of a coin in said passageway, a coin reservoir, a coin slide that is disposed adjacent said coin reservoir and that is movable relative to said coin reservoir to pay out coins from said coin reservoir, a rotatable cam to move said coin slide relative to said coin reservoir, a second fixed pivot, a latch that is mounted on said second fixed pivot for rotation relative to said coin slide, said latch being rotatable in one direction about said second fixed pivot to latch, and prevent movement of, said coin slide and thereby prevent the paying out of coins and being rotatable in the opposite direction about said second fixed pivot to unlatch, and free, said coin slide to pay out coins, and a link that connects said coin-responsive element and said latch and enables said latch and said coin-responsive element to move simultaneously, said link holding said latch in unlatching position whenever said coin-responsive element is in coin-feeling position, said latch being movable by said coin slide to move said link and said coin-responsive element, said cam normally holding said coin slide and said latch and said link in position to dispose said coin-responsive element in coin-blocking position in said passageway but being rotatable to move said coin slide and thereby cause said coin slide and said latch and said link to move said coin-responsive element outwardly of said passageway and subsequently being rotatable to enable said coin slide to move in the opposite direction and permit said coin-responsive element to move to coin-feeling position, said coin-responsive element responding to the presence of a coin in said passageway to remain in coin-feeling position and thereby cause said link to hold said latch out of latching position, said coin-responsive element moving inwardly beyond coin-feeling position if a coin is not in said passageway and thereby causing said link to move said latch to latching position, whereby the presence of a coin in said passageway enables said coin-responsive element and said link to determine the latching or unlatching of said coin slide by said latch.

9. In a coin-operated device that can respond to the insertion of coinage to pay out coins, a coin passageway, a coin-responsive element that is movable transversely of said passageway to feel for coins in said passageway and to urge said coins against one side of said passageway, a coin reservoir, a coin dispensing element that is adjacent said coin reservoir and is movable relative to said coin reservoir to pay out coins from said coin reservoir, a latch that can latch and hold said coin dispensing element and thereby prevent the paying out of coins and that can unlatch and free said coin dispensing element to pay out coins, a mechanical connection between said coin-responsive element and said latch that enables said coin-responsive element and said latch to move simultaneously, and means adapted to move said coin-responsive element and said latch, said means normally disposing said coin-responsive element in coin-blocking position in said passageway but subsequently moving said coin-responsive element outwardly of said passageway and then freeing said coin-responsive element for movement toward said one side of said passageway to feel for a coin in said passageway, said coin-responsive element responding to the presence of a coin in said passageway to urge said coin against said one side of said passageway and being held in coin-feeling position by said coin, said connection holding said latch in unlatching position whenever said coin-responsive element is in coin-feeling position, said coin-responsive element moving inwardly beyond coin-feeling position if a coin is not in said passageway and said connection moving said latch to latching position whenever said coin-responsive element moves inwardly beyond coin-feeling position.

10. In a coin-operated device that can respond to the insertion of coinage to pay out coins, a coin passageway, a fixed pivot, a coin-responsive element that is mounted on said pivot for rotation relative to said passageway, said coin-responsive element being rotatable into said passageway to feel for the presence of a coin in said passageway, a coin reservoir, a coin slide that is disposed adjacent said coin reservoir and that is movable relative to said coin reservoir to pay out coins from said coin reservoir, a cam to move said coin slide relative to said coin reservoir, a second fixed pivot, a latch that is mounted on said second fixed pivot for rotation relative to said coin slide, said latch being rotatable in one direction about said second fixed pivot to latch, and prevent movement of, said coin slide and thereby prevent the paying out of coins and being rotatable in the opposite direction about said second fixed pivot to unlatch, and free, said coin slide to pay out coins, and a link that connects said coin-responsive element and said latch and enables said latch and said coin-responsive element to move simultaneously, said link holding said latch in unlatching position whenever said coin-responsive element is in coin-feeling position, said latch having a camming surface thereon that is engageable by said coin slide to rotate said latch and thereby move said link to rotate said coin-responsive element outwardly of said passageway, said cam normally holding said coin slide and said latch and said link in position to dispose said coin-responsive element in coin-blocking position in said passageway but being movable to move said coin slide and thereby cause said coin slide and said latch and said link to move said coin-responsive element outwardly of said passageway and subsequently being rotatable to enable said coin slide to move in the opposite direction and permit said coin-responsive element to move to coin-feeling position, said coin-responsive element responding to the presence of a coin in said passageway to remain in coin-feeling position and thereby cause said link to hold said latch out of latching position, said coin-responsive element moving inwardly beyond coin-feeling position if a coin is not in said passageway and thereby causing said link to move said latch to latching position, whereby the presence of a coin in said passageway enables said coin-responsive element and said link to determine the latching or unlatching of said coin slide by said latch.

11. In a coin-operated device that can respond to the insertion of coinage to pay out coins, a coin passageway, a coin-responsive element that is movable into said passageway to feel for the presence of a coin in said passageway, a coin reservoir, a coin ejector that is disposed adjacent said coin reservoir and that is movable relative to said coin reservoir to pay out coins from said coin reservoir, a latch that can latch and hold said coin ejector and thereby prevent the paying out of coins and that can unlatch and free said coin ejector to pay out coins, a mechanical connection between said coin-responsive element and said latch that enables said coin-responsive element and said latch to move simultaneously, and means adapted to move said coin-responsive element and said latch, said coin-responsive element being movable inwardly of said passageway to and beyond coin-feeling position, said connection between said coin-responsive element and said latch causing said latch to move to latching position whenever said coin-responsive element moves inwardly beyond coin-feeling position and said connection holding said latch in unlatching position whenever said coin-responsive element remains in coin-feeling position, said coin-responsive element normally being spaced from coin-feeling position but responding to movement of said means to move to coin-feeling position and thereafter responding to the presence of a coin in said passageway to hold said coin against one side of said passageway and to be held in coin-feeling position by said coin, said coin-responsive element acting through said connection to hold said latch in unlatching position whenever said coin-responsive element is in coin-feeling position, said means subsequently moving said coin-responsive element away from coin-feeling position to release said coin, said coin-responsive element moving inwardly beyond coin-feeling position if a coin is not in said passageway and thereby causing said connection to move said latch to latching position and thereby prevent paying out of coins.

12. In a coin-operated device that can respond to the insertion of coinage to pay out coins, a coin passageway, a coin-responsive element that is movable relative to said passageway, a coin reservoir, a coin ejector that is disposed adjacent said coin reservoir and that is movable relative to said coin reservoir to eject coins from said coin reservoir, a latch that can latch and hold said coin ejector and thereby prevent the paying out of coins and that can unlatch and free said coin ejector to pay out coins, a mechanical connection between said coin-responsive element and said latch that enables said coin-responsive element and said latch to move simultaneously, and an electromotive element to move said coin-responsive element and said latch, said coin-responsive element having a coin-blocking portion that can intercept, and block the movement of, coins in said passageway and having a coin-feeling portion that can engage and feel coins in said passageway, said coin-feeling portion of said coin-responsive element being disposed below the level of said coin-blocking portion of said coin-responsive element, said latch being in ejector-latching position whenever said coin-responsive element is in coin-blocking position and being in ejector-freeing position whenever said coin-responsive element is in coin-feeling position, said coin-responsive element being moved out of coin-blocking position by said electromotive element to permit a coin to move downwardly into register with said coin-feeling portion of said coin-responsive element and thereafter being held in coin-feeling position by a coin in said passageway.

13. In a coin-dispensing device, a coin reservoir which has an open upper end, a coin ejector that is disposed adjacent said coin reservoir and that is movable relative to said coin reservoir to eject coins from said coin reservoir, a coin passageway leading to said open upper end of said coin reservoir whereby coins from said passageway can fall downwardly and enter said open upper end of said coin reservoir, said coin reservoir and said passageway being stationary, a pivot adjacent said open upper end of said coin reservoir, and a coin guide that is mounted on said pivot for rotation relative to said open upper end of said coin reservoir and relative to said passageway, said coin guide overlying part of said open upper end of said coin reservoir while leaving another part of said open upper end of said coin reservoir open for the manual insertion of coins into said coin reservoir, said coin guide being in register with said passageway to receive coins that fall downwardly from said passageway and to guide said coins into said open upper end of said coin reservoir, said coin guide having vertically-directed surfaces thereon that extend upwardly and away from said open upper end of said coin reservoir and that are spaced apart a distance which is less than the diameter of said coin reservoir but which is greater than the thickness of one of said coins, said vertically-directed surfaces of said coin guide being tall enough to hold a coin in vertical position while that coin is resting on its edge and is only partially within said open upper end of said coin reservoir and said vertically-directed surfaces of said coin guide being adapted to prevent tilting of said vertically-positioned coin until the upper face of the uppermost horizontally-disposed coin within said coin reservoir is spaced below said vertically-directed surfaces on said coin guide a distance greater than the diameter of said vertically-positioned coin and thereafter being adapted to permit said vertically-positioned coin to turn and lie flat within said coin reservoir, said coin guide being biased for rotation downwardly toward said open upper end of said coin reservoir but being readily rotatable upwardly away from said open upper end of said coin reservoir, said coin ejector having a coin-moving edge of reduced thickness and having an inclined surface contiguous with said edge, said inclined surface being adapted to engage a next-to-the-bottom coin that is within said coin reservoir but is not then to be ejected and being adapted to raise that next-to-the-bottom coin and the coins thereabove as said coin ejector moves to eject the bottom coin, said coin guide being adapted to freely rotate upwardly about said pivot and thereby prevent jams as said next-to-the-bottom coin and the coins thereabove are raised by said inclined surface on said coin ejector.

14. In a coin-operated device that can respond to the insertion of coinage to pay out coins, a coin passageway for coins of a predetermined value, a second coin passageway for coins of greater value, a coin-blocking surface that is movable into the first said passageway, a coin-feeling surface that is movable into the first said passageway, a second coin-blocking surface that is movable into said second passageway, a second coin-feeling surface that is movable into said second passageway, a coin reservoir, a coin ejector means adjacent said coin reservoir to eject coins from said coin reservoir, a cam to move said coin ejector means, a motor to rotate said cam, a latch, and a connection between said latch and said coin-feeling surfaces, the first said and said second coin-blocking surfaces being movable inwardly of the first said and said second passageways to intercept, and block the movement of, coins of said predetermined value and of said greater value, respectively, the first said and said second coin-feeling surfaces subsequently being movable inwardly of the first said and said second passageways to feel for coins of said predetermined value and of said greater value, respectively, the first said coin-feeling surface subsequently moving outwardly of the first said passageway to free any coin felt thereby, said second coin-feeling surface thereafter moving outwardly of said second passageway to free any coin felt thereby, said connection enabling said latch to respond to the engagement of the first said coin-feeling element with a coin of said predetermined value to free said ejector means so said cam can cause said ejector means to pay out a predetermined number of coins from said coin reservoir, said connection enabling said latch to respond to the longer engagement of said second coin-feeling surface with a coin of greater value to free said ejector means so said cam can cause said ejector means to pay out a greater number of coins from said coin reservoir, said motor providing the motive power for said ejector means and for said coin-blocking surfaces, said motor causing said coin-blocking surfaces to move outwardly of the first said and said second passageways to permit coins of said predetermined value and of said greater value to move into position to be felt by the first said and said second coin-feeling surfaces.

15. In a coin-operated device that can respond to the insertion of coinage to pay out coins, a coin passageway for coins of a predetermined value, a second coin passageway for coins of greater value, a coin-blocking surface that is movable into the first said passageway, a coin-feeling surface that is movable into the first said passageway, a second coin-blocking surface that is movable into said second passageway, a second coin-feeling surface that is movable into said second passageway, a coin reservoir, a coin ejector means adjacent said coin reservoir to eject coins from said coin reservoir, a cam to move said coin ejector means, a motor to rotate said cam, a latch, and a connection between said latch and said coin-feeling surfaces, the first said and said second coin-blocking surfaces being movable inwardly of the first said and said second passageways to intercept, and block the movement of, coins of said predetermined value and of said greater value, respectively, the first said and said second coin-feeling surfaces subsequently being movable inwardly of the first said and said second passageways to feel for coins of said predetermined value and of said greater value, respectively, the first said coin-feeling surface subsequently moving outwardly of the first said passageway to free any coin felt thereby, said second coin-feeling surface thereafter moving outwardly of said second passageway to free any coin felt thereby, said connection enabling said latch to respond to the engagement of the first said coin-feeling surface with a coin of said predetermined value to free said ejector means so said cam can cause said ejector means to pay out a pretermined number of coins from said coin reservoir, said connection enabling said latch to respond to the longer engagement of said second coin-feeling surface with a coin of greater value to free said ejector means so said cam can cause said ejector means to pay out a greater number of coins from said coin reservoir, said cam having one rise to cause movement of the first said coin-feeling surface outwardly of the first said passageway after the first coin-blocking surface has intercepted a coin of said predetermined value and thereby enabling said coin of said predetermined value to move downwardly into position in register with the first said coin-feeling surface where it can then be felt by the first said coin-feeling surface and said cam having a second rise to cause movement of said second coin-feeling surface outwardly of said second passageway after said second coin-blocking surface has intercepted a coin of greater value and thereby enabling said coin of greater value to move downwardly into position in register with said second coin-feeling surface where it can then be felt by said second coin-feeling surface, said second cam rise moving said second coin-feeling surface further than said one cam rise moves the first said coin-feeling surface.

16. In a coin-operated device that can respond to the insertion of coinage to pay out coins, a coin passageway, a coin actuated switch that is adjacent said passageway, a coin-blocking surface that is movable into said passageway, a coin-feeling surface that is movable into said passageway, an actuator for said switch that responds to coins passing to said coin-blocking surface to move and thereby actuate said switch, a lever that is movable to hold said switch actuator in moved position, a coin reservoir, a coin ejector that is disposed adjacent said coin reservoir and that is movable relative to said coin reservoir to eject coins from said coin reservoir, a cam to move said ejector relative to said coin reservoir and to move said lever to actuator-holding position, a motor that responds to actuation of said switch to rotate said cam and to move said coin-blocking surface and said coin-feeling surface, a latch that can hold said coin ejector and thereby prevent the paying out of coins and that can free said coin ejector to pay out coins, and a connection between said latch and said coin-feeling surface that enables said latch and said coin-feeling surface to move simultaneously, said latch being in ejector-freeing position whenever said coin-feeling surface feels a coin, said coin-blocking surface normally being in position to intercept, and block movement of, coins and said latch normally being in position to hold said coin ejector and thereby prevent the paying out of coins, said cam moving said lever to actuator-holding position before said coin-blocking surface frees said coin and before said coin-feeling surface feels said coin and said cam freeing said lever from actuator-holding position after said cam has moved said ejector relative to said coin reservoir.

References Cited in the file of this patent

UNITED STATES PATENTS

| | | |
|---|---|---|
| 1,111,389 | Kastner et al. | Sept. 22, 1914 |
| 1,404,909 | Thompson | Jan. 31, 1922 |
| 1,530,906 | Nelson | Mar. 24, 1925 |
| 1,746,398 | Khalil | Feb. 11, 1930 |
| 1,801,801 | Chalmers | Apr. 21, 1931 |
| 2,087,787 | Stuart | July 20, 1937 |
| 2,112,511 | Williams | Mar. 29, 1938 |
| 2,185,148 | Evans et al. | Dec. 26, 1939 |
| 2,250,051 | Patzer | July 22, 1941 |
| 2,265,576 | Peterson | Dec. 9, 1941 |
| 2,376,403 | Thompson et al. | May 22, 1945 |
| 2,538,358 | Farrell | Jan. 16, 1951 |
| 2,571,596 | Meredith et al. | Oct. 16, 1951 |
| 2,581,502 | Wallin | Jan. 8, 1952 |
| 2,585,718 | Adams et al. | Feb. 12, 1952 |
| 2,605,774 | Damon et al. | Aug. 5, 1952 |
| 2,618,280 | York | Nov. 18, 1952 |
| 2,637,431 | Harris | May 5, 1953 |
| 2,647,608 | Dahlberg et al. | Aug. 4, 1953 |
| 2,846,042 | Hansen | Aug. 5, 1958 |
| 2,973,076 | Hatcher | Feb. 28, 1961 |

FOREIGN PATENTS

| | | |
|---|---|---|
| 16,787 | Great Britain | of 1907 |
| 503,257 | Great Britain | Apr. 4, 1939 |
| 601,498 | Great Britain | May 6, 1948 |